United States Patent
Mishra et al.

(10) Patent No.: US 12,124,401 B2
(45) Date of Patent: Oct. 22, 2024

(54) INTERRUPT MANAGEMENT ON A ONE-WIRE BIDIRECTIONAL BUS

(71) Applicant: QUALCOMM Incorporated, San Diego, CA (US)

(72) Inventors: Lalan Jee Mishra, Escondido, CA (US); Umesh Srikantiah, San Diego, CA (US); Francesco Gatta, San Diego, CA (US); Richard Dominic Wietfeldt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 171 days.

(21) Appl. No.: 18/155,499

(22) Filed: Jan. 17, 2023

(65) Prior Publication Data
US 2024/0241853 A1 Jul. 18, 2024

(51) Int. Cl.
*G06F 13/42* (2006.01)
*G06F 13/24* (2006.01)

(52) U.S. Cl.
CPC .......... *G06F 13/4295* (2013.01); *G06F 13/24* (2013.01)

(58) Field of Classification Search
CPC ...... G06F 13/24; G06F 13/42; G06F 13/4282; G06F 13/4295
USPC ................................ 710/105, 106, 110, 305
See application file for complete search history.

(56) References Cited

U.S. PATENT DOCUMENTS

| | | | |
|---|---|---|---|
| 2011/0185096 A1* | 7/2011 | Henig | H05B 45/30 710/260 |
| 2014/0229644 A1* | 8/2014 | Thanigasalam | G06F 13/4282 710/262 |
| 2015/0193297 A1 | 7/2015 | Ngo et al. | |
| 2015/0199287 A1 | 7/2015 | Sengoku | |
| 2016/0147686 A1* | 5/2016 | Poulsen | G06F 13/3625 710/110 |
| 2017/0024354 A1 | 1/2017 | Zhang et al. | |

OTHER PUBLICATIONS

International Search Report and Written Opinion—PCT/US2023/083866—ISA/EPO—Mar. 26, 2024.

* cited by examiner

*Primary Examiner* — Ilwoo Park
(74) *Attorney, Agent, or Firm* — Loza & Loza, LLP/Qualcomm

(57) ABSTRACT

A data communication apparatus comprises a line driver configured to couple the data communication apparatus to a 1-wire serial bus; and a controller configured to: transmit a plurality of synchronization pulses over the 1-wire serial bus after a sequence start condition (SSC) has been transmitted over the 1-wire serial bus, the plurality of synchronization pulses being configured to synchronize one or more receiving devices coupled to the 1-wire serial bus to an untransmitted transmit clock signal; initiate an interrupt handling procedure when the plurality of synchronization pulses is encoded with a first value; and initiate a read transaction or a write transaction with at least one of the one or more receiving devices coupled to the 1-wire serial bus when the plurality of synchronization pulses is encoded with a second value.

30 Claims, 15 Drawing Sheets

INTERRUPT MANAGEMENT ON A ONE-WIRE BIDIRECTIONAL BUS

TECHNICAL FIELD

The present disclosure relates generally to serial communication and, more particularly, to in-band interrupts and interrupt handling involving devices configured for one-wire communication through a Radio Frequency Front-End interface.

BACKGROUND

Mobile communication devices may include a variety of components including circuit boards, integrated circuit (IC) devices and/or System-on-Chip (SoC) devices. The components may include processing circuits, user interface components, storage and other peripheral components that communicate through a serial bus. The serial bus may be operated in accordance with a standardized or proprietary protocol. In one example, a serial bus is operated in accordance with an Inter-Integrated Circuit (I2C bus or I$^2$C) protocol. The I2C bus was developed to connect low-speed peripherals to a processor, where the I2C bus is configured as a multi-drop bus. A two-wire I2C bus includes a Serial Data Line (SDA) that carries a data signal, and a Serial Clock Line (SCL) that carries a clock signal. In another example, the Improved Inter-Integrated Circuit (I3C) protocols defined by the Mobile Industry Processor Interface (MIPI) Alliance derive certain implementation aspects from the I2C protocol including separate clock and data lines.

In another example, the Radio Frequency Front-End (RFFE) interface defined by the MIPI Alliance provides a communication interface for controlling various radio frequency (RF) front-end devices, including power amplifiers (PAs), low-noise amplifiers (LNAs), antenna tuners, filters, sensors, power management devices, switches, etc. These devices may be collocated in a single IC device or provided in multiple IC devices. In a mobile communication device, multiple antennas and radio transceivers may support multiple concurrent RF links.

In another example, the system power management interface (SPMI) defined by the MIPI Alliance provides a hardware interface that may be implemented between baseband or application processors and peripheral components. In some implementations, the SPMI is deployed to support power management operations within a device.

The use of MIPI-defined serial buses in place of parallel buses can reduce the number of physical general-purpose input/output (GPIO) pins required to support communication between multiple devices. As device complexity increases, demand for GPIO pins also increases and there is continual demand for simplified bus architectures.

SUMMARY

Certain aspects of the disclosure relate to systems, apparatus, methods and techniques that can support communication with device interfaces that use a single-wire link. In some implementations, a combination of control signaling and Manchester encoding can be used to maintain synchronization between clock signals in transmitting and receiving devices. The single-wire link may format datagrams in accordance with RFFE, SPMI or another standards-defined protocol.

In various aspects of the disclosure, a method of data communication performed at a host device, includes: transmitting a plurality of synchronization pulses over a 1-wire serial bus after a sequence start condition (SSC) has been transmitted over the 1-wire serial bus, the plurality of synchronization pulses being configured to synchronize one or more receiving devices coupled to the 1-wire serial bus to an untransmitted transmit clock signal; initiating an interrupt handling procedure when the plurality of synchronization pulses is encoded with a first value; and initiating a read transaction or a write transaction with at least one of the one or more receiving devices coupled to the 1-wire serial bus when the plurality of synchronization pulses is encoded with a second value.

In various aspects of the disclosure, a data communication apparatus, includes a line driver configured to couple the data communication apparatus to a 1-wire serial bus; and a controller configured to: transmit a plurality of synchronization pulses over the 1-wire serial bus after an SSC has been transmitted over the 1-wire serial bus, the plurality of synchronization pulses being configured to synchronize one or more receiving devices coupled to the 1-wire serial bus to an untransmitted transmit clock signal; initiate an interrupt handling procedure when the plurality of synchronization pulses is encoded with a first value; and initiate a read transaction or a write transaction with at least one of the one or more receiving devices coupled to the 1-wire serial bus when the plurality of synchronization pulses is encoded with a second value.

In various aspects of the disclosure, a method of data communication performed at a subordinate device, includes receiving a plurality of synchronization pulses from a 1-wire serial bus after an SSC has been received from the 1-wire serial bus; using the plurality of synchronization pulses to synchronize an internal clock signal; participating in an interrupt handling procedure when the plurality of synchronization pulses is encoded with a first value; and responding to a read or write command when the plurality of synchronization pulses is encoded with a second value and followed by an address corresponding to a device address associated with the subordinate device.

In various aspects of the disclosure, a data communication apparatus includes a line driver configured to couple the data communication apparatus to a 1-wire serial bus; and a controller configured to: receive a plurality of synchronization pulses from the 1-wire serial bus after an SSC has been received from the 1-wire serial bus; use the plurality of synchronization pulses to synchronize an internal clock signal; participate in an interrupt handling procedure when the plurality of synchronization pulses is encoded with a first value; and respond to a read or write command when the plurality of synchronization pulses is encoded with a second value and followed by an address corresponding to a device address associated with the data communication apparatus.

DETAILED DESCRIPTION

Figure 1:
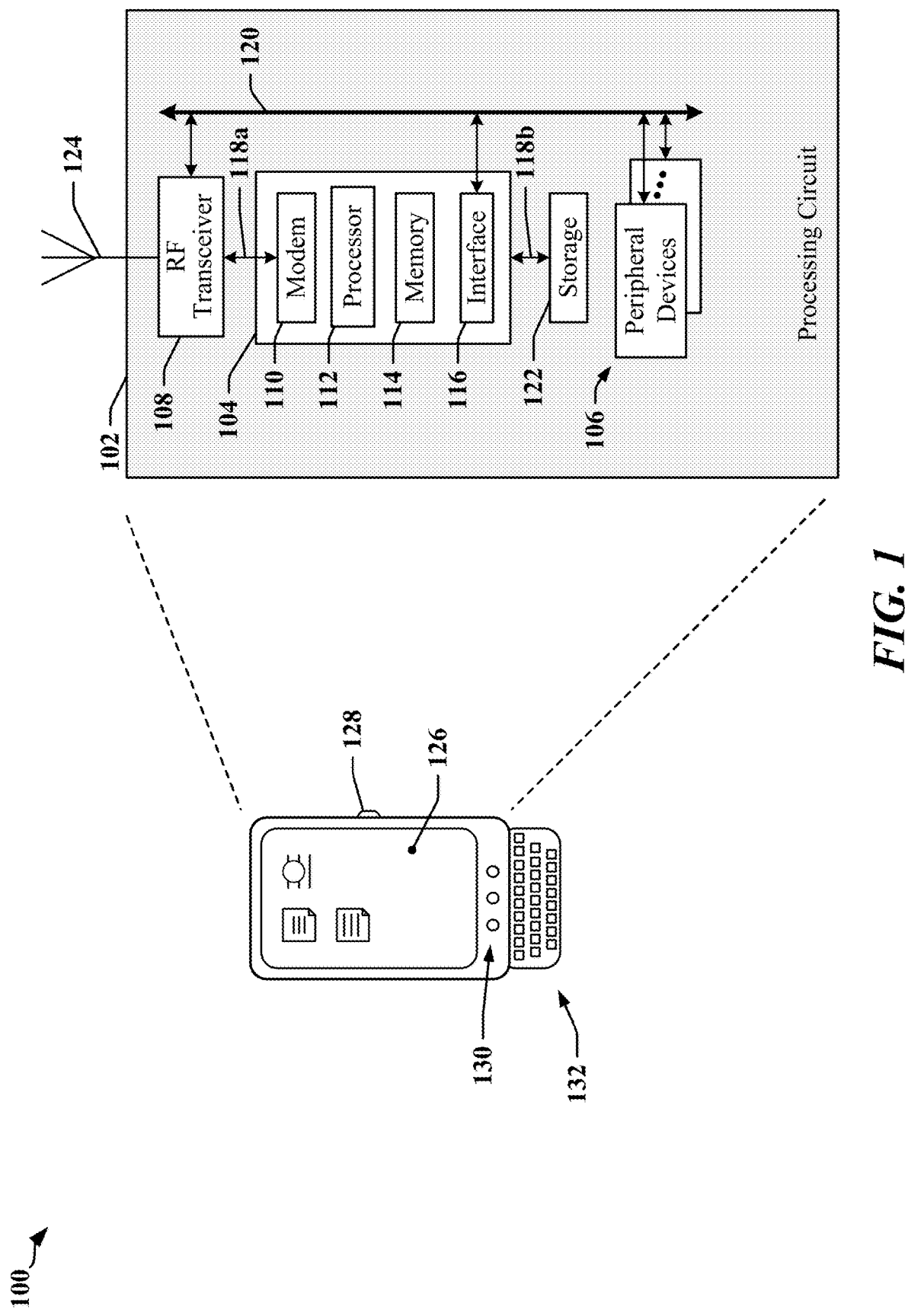
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Certain aspects of the disclosure relate to serial bus configurations in which multiple devices can communicate at various times. The described serial buses are typically operated in a hierarchical manner, in that one device controls communication during a transaction. The controlling device may be referred to as a host device, a bus master device, a managing device or another term favored by standards defining the protocols implemented by the controlling device. In some serial bus configurations, a single controlling device manages or controls communication during all transactions conducted over the serial bus. In other serial bus configurations, multiple devices can operate as the controlling device and one device serves as the controlling device for each transaction conducted over the serial bus. The controlling device may provide a common clock signal that is transmitted over a conventional two-wire serial bus. The controlling device may provide control signaling that identifies a type of transaction to be conducted over a conventional two-wire serial bus. During certain transactions, a controlling device may transmit commands directed to one or more receiving devices using address information provided in or with the commands. The receiving devices may be referred to as a subordinate device, a client device, a slave device, a peripheral device or another term favored by standards defining the protocols implemented by the controlling device. For the purposes of this disclosure, a controlling device will be referred to as a host device and associated receiving devices will be referred to as subordinate devices.

Overview

Devices that include multiple SoC and other IC devices often employ a shared communication interface that may include a serial bus or other data communication link to connect processors with modems and other peripherals. The serial bus or other data communication link may be operated in accordance with multiple standards or protocols. For example, the serial bus may be operated in accordance with an I2C, I3C, SPMI, and/or RFFE protocol, or another protocol that may be configured for half-duplex operation. Increased functionality and complexity of operations involving devices coupled to serial buses, together with the imposition of more stringent timing constraints in support of applications, peripherals and sensors can result in greater demand on GPIO pins and communication link throughput.

Certain aspects of the disclosure relate to techniques for communication over a 1-wire serial bus, using Manchester encoding and synchronization signaling that can be distinguished by devices coupled to the 1-wire serial bus. The synchronization signaling may be configured to enable receiving devices to synchronize clock signals generated in a device that is currently transmitting over the 1-wire serial bus. In one aspect, a host device may be adapted to format datagrams in accordance with RFFE or SPMI protocols. In another aspect, subordinate devices may assert interrupts by initiating a sequence start condition (SSC) while the 1-wire serial bus is idle. In another aspect, a host device may signal a type of transaction to be conducted using encoded synchronization patterns. One or more types of transaction may be configured to enable the host device to identify subordinate devices requesting or needing interrupt service.

In one example, a host device configured in accordance with certain aspects of this disclosure may transmit synchronization pulses over a 1-wire serial bus after an SSC has been transmitted over the 1-wire serial bus, the synchronization pulses being configured to synchronize one or more subordinate devices coupled to the 1-wire serial bus to an untransmitted transmit clock signal. The host device may initiate an interrupt handling procedure when the synchronization pulses is encoded with a first value and may initiate a read or write transaction with one or more of the subordinate devices when the plurality of synchronization pulses is encoded with a second value. The synchronization pulses may be encoded using Manchester encoding.

Certain aspects disclosed herein provide protocols that may replace or supplement a serial bus protocol, such as an I2C, I3C, SPMI, and/or RFFE protocol. Certain aspects are applicable to a serial bus operated in half-duplex mode or full-duplex mode. Certain aspects are applicable to point-to-point Universal Asynchronous Receiver/Transmitter (UART) interfaces, Line-Multiplexed UART (LM-UART) interfaces, or another type of point-to-point interface. In some implementations, certain aspects disclosed herein may be deployed to support exchange of virtual GPIO (VGI) messages, which can be used to communicate the state or change in state of physical GPIO pins without physical connections between devices. Certain aspects are applicable to multipoint interfaces, point-to-point interfaces, or interfaces switchable between point-to-point and multipoint modes.

Examples of Apparatus That Employ Serial Data Links

According to certain aspects of the disclosure, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that may employ a data communication bus. The apparatus 100 may include a processing circuit 102 having multiple circuits or devices 104, 106 and/or 108, which may be implemented in one or more ASICs or in an SoC. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, external keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
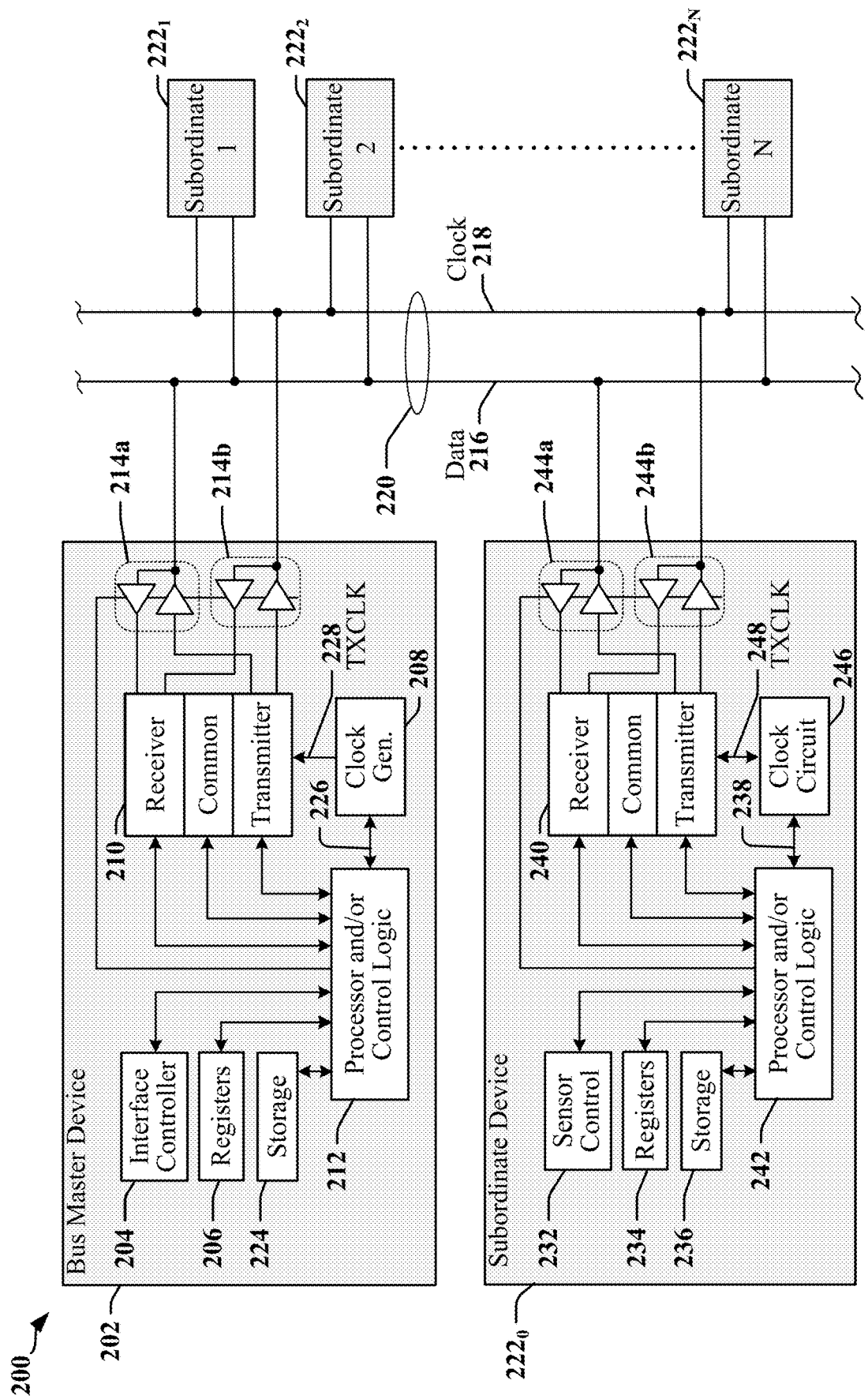
FIG. 2 illustrates a first example of an apparatus employing a data link that may be used to communicatively couple two or more devices.

FIG. 2 illustrates a first example of an apparatus 200 employing a data link that may be used to communicatively couple two or more devices. Here, the apparatus 200 includes multiple devices 202, and $222_0$-$222_N$ coupled to a two-wire serial bus 220. The devices 202 and $222_0$-$222_N$ may be implemented in one or more semiconductor IC devices, such as an application processor, SoC or ASIC. In various implementations certain of the devices 202 and $222_0$-$222_N$ may include, support or operate as a modem, a signal processing device, a display driver, a camera, a user interface, a sensor, a sensor controller, a media player, a transceiver, and/or other such components or devices. In some examples, one or more devices $222_0$-$222_N$ may be used to control, manage or monitor a sensor device. Communication between devices 202 and $222_0$-$222_N$ over the serial bus 220 is controlled by a host device 202. Certain types of bus can support multiple host devices 202.

In one example, a host device 202 may include an interface controller 204 that may manage access to the serial bus, configure dynamic addresses for subordinate devices and/or generate a clock signal 228 to be transmitted on a clock line 218 of the serial bus 220. The host device 202 may include configuration registers 206 or other storage 224, and other control logic 212 configured to handle protocols and/or higher-level functions. The control logic 212 may include a processing circuit such as a state machine, sequencer, signal processor or general-purpose processor. The host device 202 includes a transceiver 210 and line drivers/receivers 214a and 214b. The transceiver 210 may include receiver, transmitter and common circuits, where the common circuits may include timing, logic and storage circuits and/or devices. In one example, the transmitter encodes and transmits data based on timing in the clock signal 228 provided by a clock generation circuit 208. Other timing clocks 226 may be used by the control logic 212 and other functions, circuits or modules.

One or more devices $222_0$-$222_N$ may be configured to operate as a subordinate device. In some examples, a subordinate device may include circuits and modules that support a display, an image sensor, and/or circuits and modules that control and communicate with one or more sensors that measure environmental conditions. In one example, a device $222_0$ configured to operate as a subordinate device may provide a control function, module or circuit 232 that includes circuits and modules to support a display, an image sensor, and/or circuits and modules that control and communicate with one or more sensors that measure environmental conditions. In this example, the device $222_0$ can include configuration registers 234 or other storage 236, control logic 242, a transceiver 240 and line drivers/receivers 244a and 244b. The control logic 242 may include a processing circuit such as a state machine, sequencer, signal processor or general-purpose processor. The transceiver 240 may include receiver, transmitter and common circuits, where the common circuits may include timing, logic and storage circuits and/or devices. In one example, the transmitter encodes and transmits data based on timing in a clock signal 248 provided by clock generation and/or recovery circuits 246. In some instances, the clock signal 248 may be derived from a signal received from the clock line 218. Other timing clocks 238 may be used by the control logic 242 and other functions, circuits or modules.

The serial bus 220 may be operated in accordance with RFFE, I2C, I3C, SPMI, or other protocols. At least one of the devices 202 and $222_0$-$222_N$ may be configured to operate as a host device and a subordinate device on the serial bus 220. Two or more of the devices 202 and $222_0$-$222_N$ may be configured to operate as a host device on the serial bus 220. The protocol selected to control operation of the serial bus 220 may define direct current (DC) characteristics affecting certain signal levels associated with the serial bus 220, and/or alternating current (AC) characteristics affecting certain timing aspects of signals transmitted on the serial bus 220. In various examples, a 2-wire serial bus 220 transmits data on a data line 216 and a clock signal on the clock line 218. In some instances, data may be encoded in the signaling state, or transitions in signaling state of the data line 216 and the clock line 218.

Figure 3:
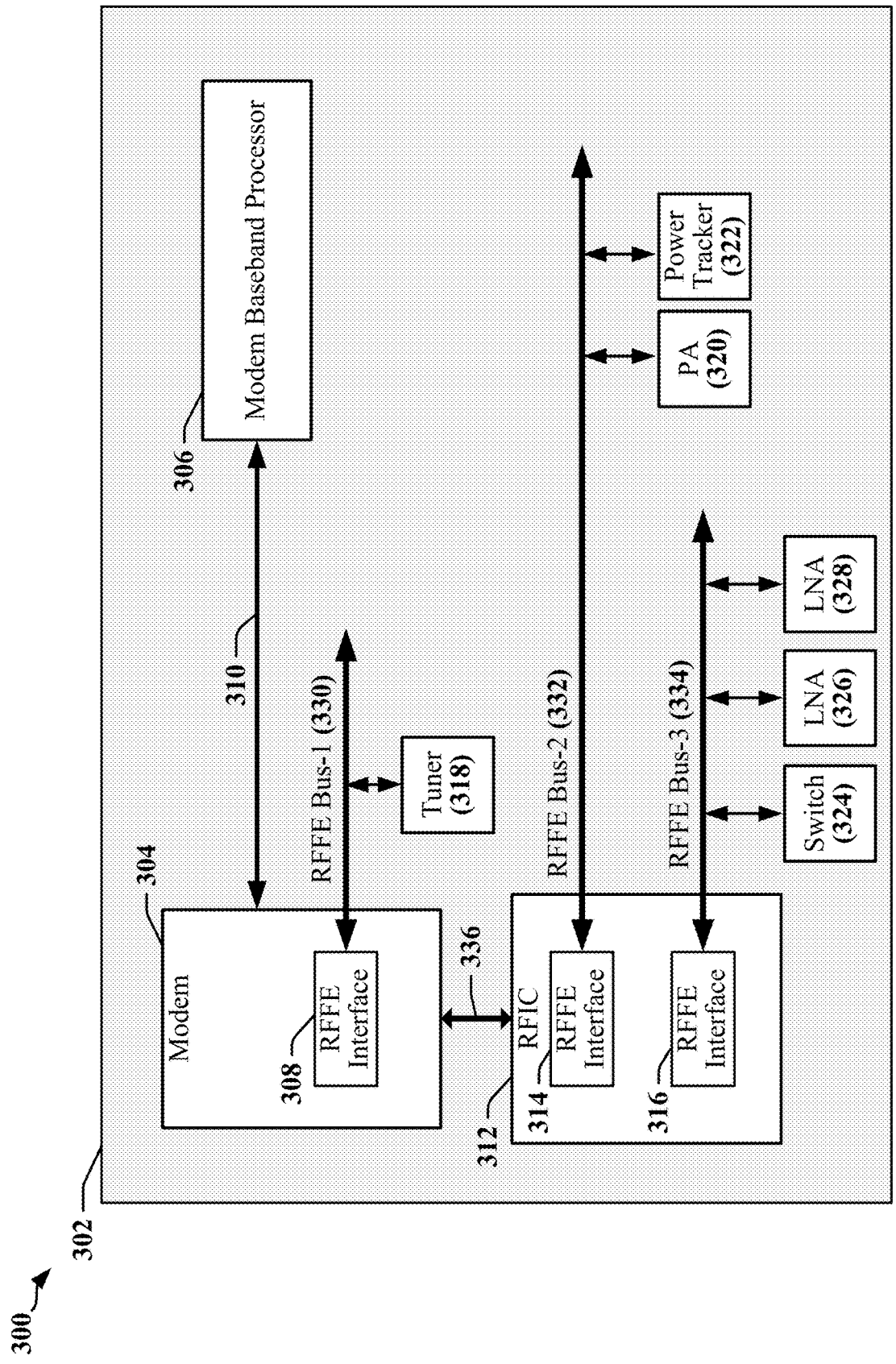
FIG. 3 illustrates a second example of an apparatus employing data links that may be used to communicatively couple two or more devices, including various radio frequency front-end devices.

FIG. 3 illustrates a second example of an apparatus 300 employing data links that may be used to communicatively couple two or more devices. In this example, a chipset or device 302 employs multiple RFFE buses 330, 332, 334 to couple various RF front-end devices 318, 320, 322, 324, 326, 328. A modem 304 includes an RFFE interface 308 that couples the modem 304 to a first RFFE bus 330. The modem 304 may communicate with a baseband processor 306 and a Radio-Frequency IC (RFIC 312) through one or more communication links 310, 336. The illustrated device 302 may be embodied in one or more of a mobile communication device, a mobile telephone, a mobile computing system, a notebook computer, a tablet computing device, a media player, a gaming device, a wearable computing and/or communication device, an appliance, or the like.

In various examples, the device 302 may be implemented with one or more baseband processors 306, modems 304, RFICs 312, multiple communication links 310, 336, multiple RFFE buses 330, 332, 334 and/or other types of buses. The device 302 may include other processors, circuits, modules and may be configured for various operations and/or different functionalities. In the example illustrated in FIG. 3, the Modem is coupled to an RF tuner 318 through its RFFE interface 308 and the first RFFE bus 330. The RFIC 312 may include one or more RFFE interfaces 314, 316, controllers, state machines and/or processors that configure and control certain aspects of the RF front-end. The RFIC 312 may communicate with a PA 320 and a power tracking module 322 through a first of its RFFE interfaces 314 and a second RFFE bus 332. The RFIC 312 may communicate with a switch 324 and one or more LNAs 326, 328 through a second of its RFFE interfaces 316 and a third RFFE bus 334.

Bus latency can affect the ability of a serial bus to handle high-priority, real-time and/or other time-constrained messages. Low-latency messages, or messages requiring low bus latency, may relate to sensor status, device-generated real-time events and virtualized GPIO state. In one example, bus latency may be measured as the time elapsed between a message becoming available for transmission and the delivery of the message or, in some instances, commencement of transmission of the message. Other measures of bus latency may be employed. Bus latency typically includes delays incurred while higher priority messages are transmitted, interrupt processing, the time required to terminate a datagram in process on the serial bus, the time to transmit commands causing bus turnaround between transmit mode and receive mode, bus arbitration and/or command transmissions specified by protocol.

In certain examples, latency-sensitive messages may include coexistence messages. Coexistence messages are transmitted in a multisystem platform to prevent or reduce instances of certain device types impinging on each other, including for example, switches 324, LNAs 326, 328, PAs 320 and other types of devices that operate concurrently in a manner that can generate inter-device interference, or that could potentially cause damage to one or more devices. Devices that may interfere with one another may exchange coexistence management (CxM) messages to permit each device to signal imminent actions that may result in interference or conflict. CxM messages may be used to manage operation of shared components including a switch 324, LNA 326, 328, PA 320 and/or an antenna.

Multi-drop interfaces such as RFFE, SPMI, I3C, etc. can reduce the number of physical input/output (I/O) pins used to communicate between multiple devices. Protocols that support communication over a multi-drop serial bus define a datagram structure used to transmit command, control and data payloads. Datagram structures for different protocols define certain common features, including addressing used to select devices to receive or transmit data, clock generation and management, interrupt processing and device priorities. In this disclosure, the example of RFFE protocols may be employed to illustrate certain aspects disclosed herein. However, the concepts disclosed herein are applicable to other serial bus protocols and standards.

Figure 4:
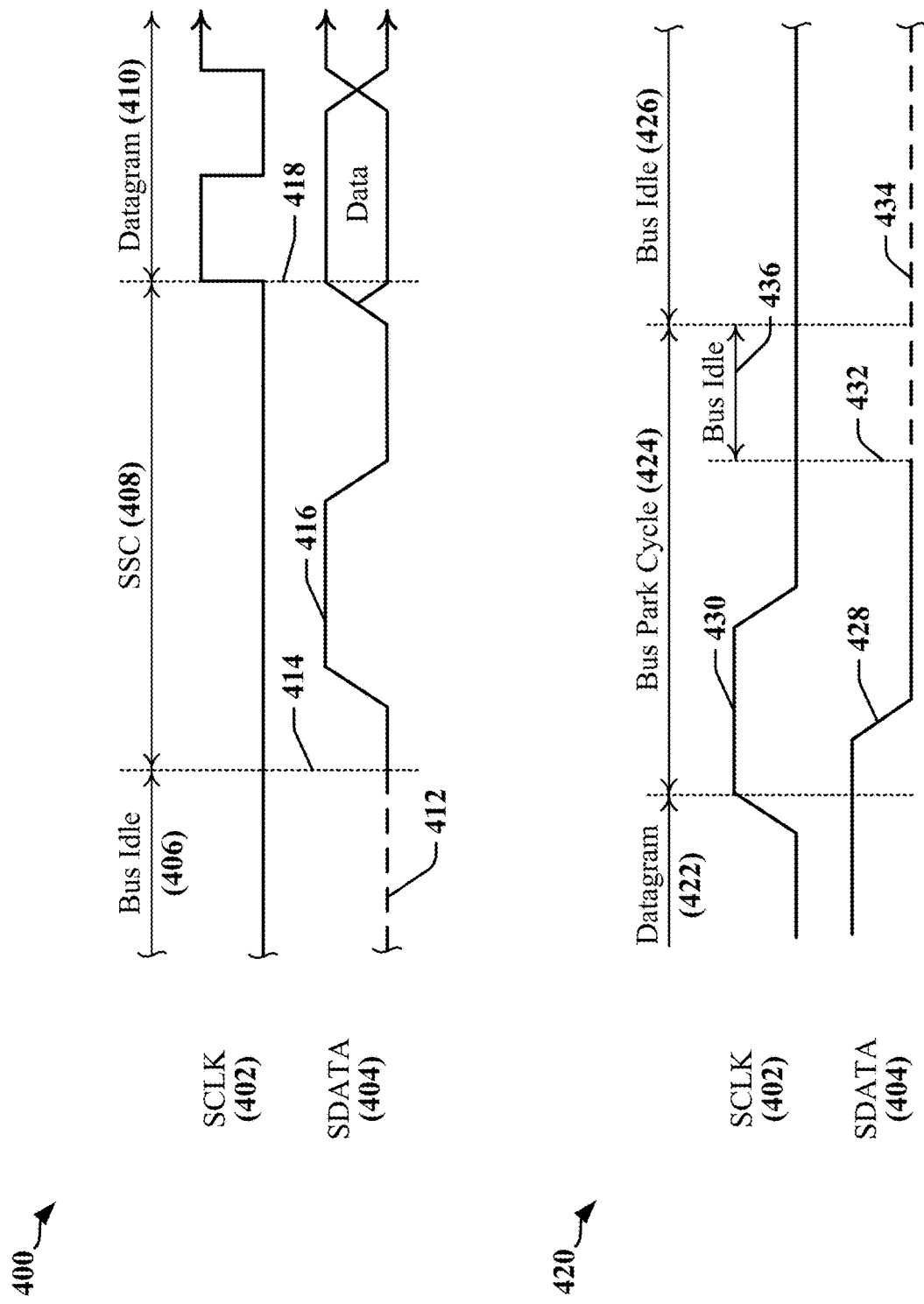
FIG. 4 includes timing diagrams that illustrate signaling transmitted to delineate the boundaries of RFFE and SPMI datagrams.

FIG. 4 includes timing diagrams 400, 420 that illustrate signaling that is transmitted to delineate the boundaries of datagrams transmitted in accordance with RFFE protocols. The timing diagrams 400, 420 show the relative timing of signals transmitted on a 2-wire serial bus that provides a clock signal on SCLK 402 and provides for exchange of data over SDATA 404. The first timing diagram 400 illustrates timing of a sequence start condition (SSC 408) that is transmitted to signal the start of a transaction such as the transmission of a datagram 410. The SSC 408 is transmitted when the serial bus is in an idle state 406. In the idle state 406, SCLK 402 is driven at full strength by a host while subordinate devices coupled to the serial bus present a high impedance to SCLK 402. SCLK 402 is held in the low signaling state (here, at zero volts) by the host. In the idle state 406, SDATA 404 is weakly driven by the host or is held in the weakly driven low signaling state 412 using a keeper circuit or a weak pull-down circuit. A keeper circuit or a weak pull-down circuit may maintain the signaling state of SDATA 404, for example, when the host has caused its line driver to enter a high impedance state and when no other device is driving SDATA 404. The weakly driven low signaling state 412 can easily be overcome by another line driver that can drive SDATA 404 at full strength.

In a master-driven SSC 408, the host commences transmission of the SSC 408 at a first point in time 414 when it begins to drive SDATA 404 at full strength, initially at the low signaling state. The host then provides a pulse 416 on SDATA 404 while continuing to drive SCLK 402 to the low signaling state. The pulse 416 has duration of at least one cycle of a clock signal provided on SCLK 402 during transmission of a datagram 410. At a second point in time 418, the host commences transmission of clock pulses on SCLK 402, thereby providing the clock signal used to control or indicate timing of a datagram 410 transmitted on SDATA 404.

The second timing diagram 420 illustrates timing of a bus park cycle (the BPC 424) that may be transmitted to signal the termination of a datagram 422, for example. The BPC 424 is transmitted by providing a falling edge 428 on SDATA 404 while SCLK 402 is in a high signaling state 430. By protocol, transitions on SDATA 404 during transmission of the datagram 422 are permitted only while the clock signal is in the low signaling state, and the falling edge 428 that occurs while SCLK 402 is in the high signaling state 430 is interpreted as control signaling (i.e., the BPC 424). The falling edge 428 is provided by the host driving SDATA 404 low at full strength. The host then drives SCLK 402 low and continues to drive SCLK 402 at full strength through subsequent bus idle intervals 426, 436. After driving SCLK 402 low, the host initiates a bus idle interval 436 at a time 432 when the host causes its line driver to enter the high impedance state. While no other device is driving SDATA 404, SDATA 404 remains in the weakly driven low signaling state 434. The BPC 424 is terminated and the serial bus enters a bus idle interval 426 until the next datagram is ready for transmission.

Figure 5:
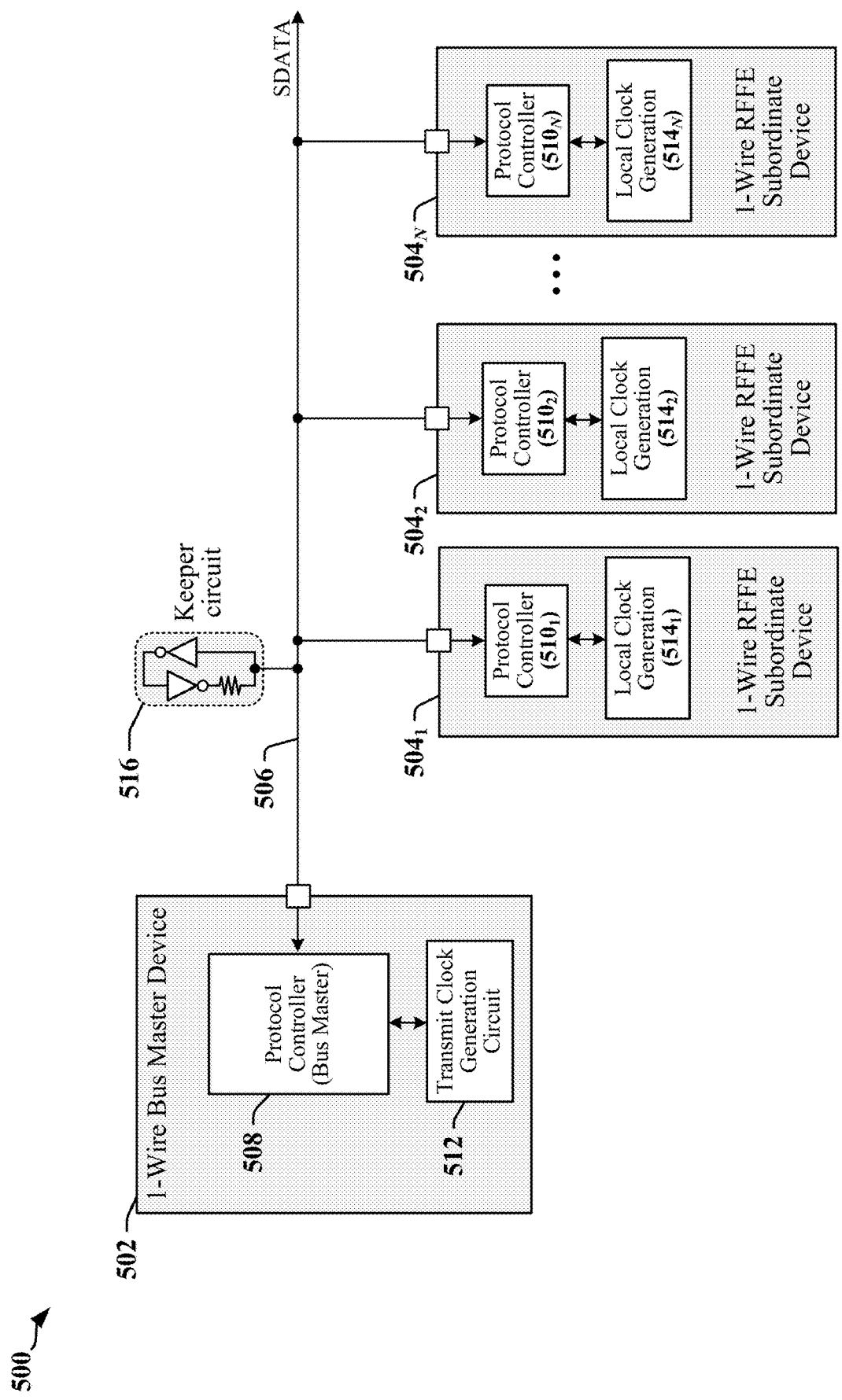
FIG. 5 illustrates a system in which a host device communicates with one or more one-wire subordinate devices in accordance with certain aspects disclosed herein.

FIG. 5 illustrates a system 500 in which a host device 502 communicates with one or more one-wire subordinate devices $504_1$-$504_N$ in accordance with certain aspects disclosed herein. The host device 502 may be provided in an RFIC, modem, application processor or another type of device. The host device 502 may be adapted to exchange data with the one-wire subordinate devices $504_1$-$504_N$ over a single wire, referred to as the SDATA line 506 in the illustrated system 500. Data is encoded in a signal transmitted over the SDATA line 506, where the signal includes embedded clock information that can be used by the receiving device to decode data from the signal.

The host device 502 and the one-wire subordinate devices $504_1$-$504_N$ typically include respective protocol controllers 508, $510_1$-$510_N$. The protocol controllers 508, $510_1$-$510_N$ may have a processor, controller, state machine or other logic circuits configured to support one or more protocols. The protocol controller 508 in the host device 502 may be further configured to manage communication over the SDATA line 506. In some instances, the protocol controller 508 performs some of the functions of a host. In some implementations, the protocol controller 508 in the host device 502 may be used to configure one or more of the one-wire subordinate devices $504_1$-$504_N$. The host device 502 may determine a configuration of a one-wire subordinate device $504_1$-$504_N$ that is a designated recipient of data to be transmitted over the SDATA line 506, and may cause the protocol controller 508 to encode data intended for the recipient one-wire subordinate device $504_1$-$504_N$ in a signal to be transmitted over the SDATA line 506 and addressed to the one-wire subordinate device $504_1$-$504_N$.

The host device 502 may include a transmit clock generator 512 that can be used to define timing for transmissions over the SDATA line 506. Each of the one-wire subordinate devices $504_1$-$504_N$ includes a local clock generation circuit $514_1$-$514_N$ that provides timing for the corresponding protocol controller $510_1$-$510_N$. The local clock generation circuits $514_1$-$514_N$ may be synchronized using synchronization pulses transmitted by the host device 502 after an SSC or transmitted by the host device 502 or by one of the one-wire subordinate devices $504_1$-$504_N$ after a line turnaround. In accordance with certain aspects of this disclosure, the local clock generation circuits $514_1$-$514_N$ may be synchronized using transitions in Manchester-encoded commands and data payloads transmitted over the SDATA line 506. The local clock generation circuits $514_1$-$514_N$ may include a ring oscillator or delay locked loop. In some implementations, the local clock generation circuits $514_1$-$514_N$ may include an injection-locked oscillator that responds to synchronizing pulses and/or the transitions in Manchester-encoded command and data payload transmissions.

A keeper circuit 516 may be coupled to the SDATA line 506 to facilitate line turnaround, in-band interrupt requests or arbitration procedures in accordance with certain aspects disclosed herein. In one example, the keeper circuit 516 may be configured as a positive feedback circuit that drives the SDATA line 506 through a high impedance output, and receives feedback from the SDATA line 506 through a low impedance input. The keeper circuit 516 may be configured to maintain the last asserted voltage on the SDATA line 506. The keeper circuit 516 can be easily overcome by an active line driver in the host device 502 or in one of the one-wire subordinate devices $504_1$-$504_N$.

Conventional implementations of 1-wire bidirectional communication buses have been hampered by restrictively slow data rates. Many conventional 1-wire bidirectional communication buses are limited to sub-megahertz (MHz) signaling rates and are unsuited to high-speed RF-Front End control applications which can require clock rates of up to 52 MHz. Some conventional 1-wire bidirectional communication buses attempt to increase data rates through the use of pulse-width modulation and other data encoding schemes. However, these latter communication buses are typically unable to obtain signaling rates greater than 4 MHz due to various limitations with PWM signaling, for example.

A 1-wire bidirectional communication bus implemented in accordance with certain aspects disclosed herein can achieve data rates of up to and beyond 52 MHz. In certain examples, a signaling scheme provided for communication over 1-wire communication buses uses a combination of RFFE protocols, Manchester encoding and modified control signaling that can indicate and distinguish between various types of transactions.

Figure 6:
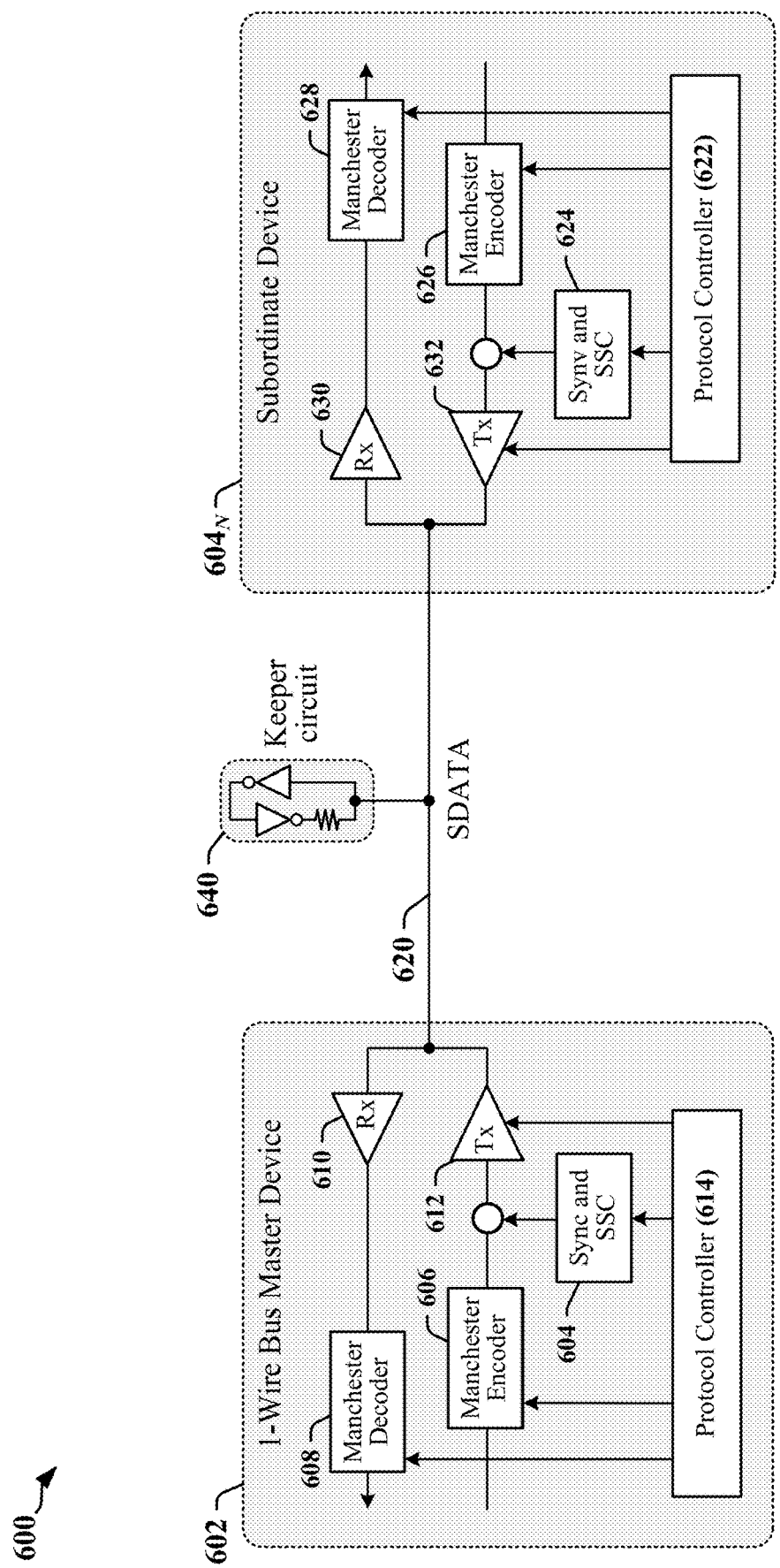
FIG. 6 illustrates an example of a 1-wire serial interface that may be configured in accordance with certain aspects of this disclosure.

FIG. 6 illustrates an example of a 1-wire serial interface 600 that may be configured in accordance with certain aspects of this disclosure. In the example, a host device 502 and one-wire subordinate device $504_N$ (see FIG. 5) are illustrated. The host device 502 includes a protocol controller 614. The protocol controller 614 may be implemented using a processor, microcontroller or finite state machine and may be used to control transmit and receive functions of the host device 502. The protocol controller 614 may include or be coupled to a signal generation circuit 604 that generates synchronization and SSC signals transmitted on the SDATA line 620 that couples the host device 502 to one or more subordinate devices $504_N$. The signal generation circuit 604 may be configured to generate different types of SSC to initiate arbitration, initiate data transfer or to abandon arbitration. The signal generation circuit 604 may be configured to generate synchronization pulses used to synchronize clock signals produced at the subordinate devices $504_N$ with a transmit clock signal generated in the host device 502.

The protocol controller 614 may be configured to selectively activate a Manchester encoder 606 and a Manchester decoder 608 based on mode of operation of the 1-wire serial interface 600. The Manchester decoder 608 may extract data and clock information from a signal received from the SDATA line 620. The protocol controller 614 may be further configured to format datagrams for transmission over the SDATA line 620. The protocol controller 614 may be further configured to generate commands to be transmitted over the SDATA line 620.

In the illustrated example, the one-wire subordinate device $504_N$ includes a protocol controller 622. The protocol controller 622 may be implemented using a processor, microcontroller or finite state machine and may be used to control transmit and receive functions of the one-wire subordinate device $504_N$. The protocol controller 622 may include or be coupled to a signal generation circuit 624 that generates synchronization pulses to be transmitted when the one-wire subordinate device $504_N$ is transmitting over the SDATA line 620. The protocol controller 622 may be further configured to cause the signal generation circuit 624 to drive the SDATA line 620 to initiate an SSC in an in-band interrupt procedure and may be further configured to cause the signal generation circuit 624 to drive the SDATA line during an arbitration procedure. The synchronization pulses generated by the signal generation circuit 604 may be configured to synchronize clock signals produced at the host device 502 with a transmit clock signal generated in the subordinate device $504_N$.

The protocol controller 622 may be configured to selectively activate a Manchester encoder 626 and a Manchester decoder 628 based on mode of operation of the 1-wire serial interface 600. The Manchester decoder 628 may extract data and clock information from a signal received from the SDATA line 620. The protocol controller 622 may be further configured to format datagrams for transmission over the SDATA line 620. The protocol controller 622 may be further configured to disassemble datagrams and/or respond to commands received from the SDATA line 620.

The protocol controller 614 may be configured to manage and control the operation of a line driver 612 and a line receiver 610. The protocol controller 622 may be configured to manage and control the operation of a line driver 632 and a line receiver 630. The line drivers 612, 632 may present a high impedance to the SDATA line 620 when inactivated or disabled. For example, the output of the line driver 612 in the host device 502 may present a high impedance to the SDATA line 620 when the one-wire subordinate device $504_N$ is configured or expected to transmit data or control signals over the SDATA line 620. The output of the line driver 632 in the one-wire subordinate device $504_N$ is typically in the high impedance state when the host device 502 is driving the SDATA line 620.

A keeper circuit 640 coupled to the SDATA line 620 facilitates line turnaround, in-band interrupt requests and arbitration procedures in a bidirectional 1-wire serial bus. It is often desired to maintain the state of the SDATA line 620 when all devices are in high impedance mode, during line turnarounds or in arbitration procedures. Line turnaround occurs when the host device 502 transitions from transmitting to receiving or from receiving to transmitting. During arbitration procedures, the host device 502 may enter high impedance mode when the one-wire subordinate device $504_N$ has the option to transmit and the line driver in the host device 502 may present a high impedance to the SDATA line 620 to avoid contention. The state of the SDATA line 620 may be maintained using the keeper circuit 640. In one example, the keeper circuit 640 may be configured as a positive feedback circuit that drives the SDATA line 620 through a high impedance output, and receives feedback from the SDATA line 620 through a low impedance input. The keeper circuit 640 may be configured to maintain the last asserted voltage on the SDATA line 620. The keeper circuit 640 can be easily overcome by the line drivers 612, 632 in the host device 502 and the one-wire subordinate device $504_N$, respectively.

Figure 7:
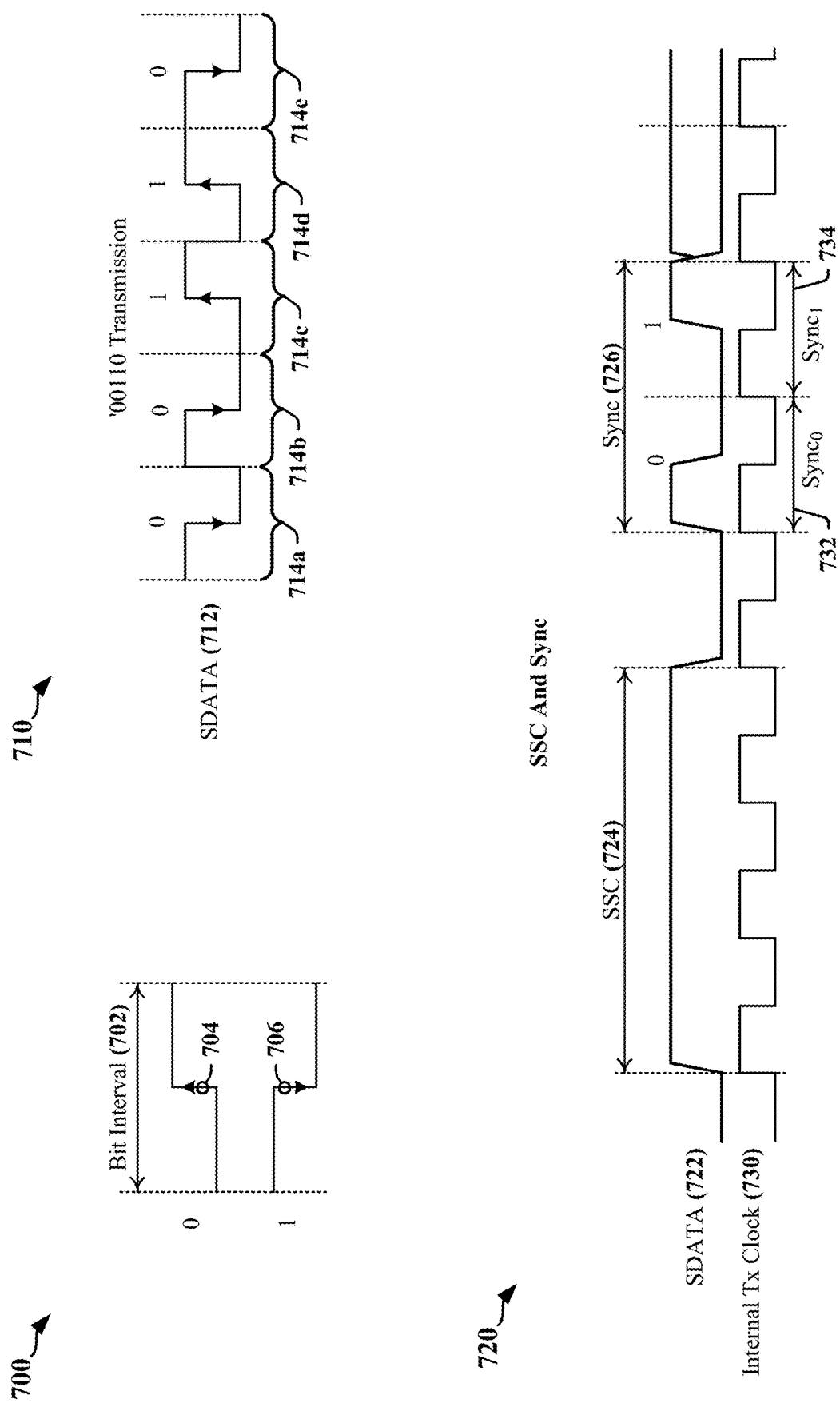
FIG. 7 illustrates certain aspects of Manchester encoding and control signaling that may be used to exchange data between a host device and one-wire subordinate devices in accordance with certain aspects of this disclosure.

FIG. 7 illustrates certain aspects of Manchester encoding and the control signaling that may be used to exchange data over a 1-wire serial bus between the host device and the one-wire subordinate devices in accordance with certain aspects of this disclosure. The signal wire of the 1-wire serial bus is referred to as SDATA 722 herein (cf. FIGS. 5 and 6). With reference to the first timing diagram 700, Manchester encoding encodes data based on the direction of a transition occurring in the middle of a bit transmission interval 702. In some implementations, SDATA 722 may be in a low state initially and a transition 704 to the high state indicates a '1' value bit. SDATA 722 may initially be in a high state and a transition 706 to the low state indicates a '0' value bit. In other implementations, SDATA 722 may be in a low state initially and a transition 704 to the high state indicates a '0' value bit. SDATA 722 may initially be in a high state and a transition 706 to the low state indicates a '1' value bit. Clock information is embedded in the transitions of the data signal that occur within every bit transmission interval 702. Certain examples illustrated in this disclosure are based on implementations in which a transition 704 to the high state indicates a '1' value bit and a transition 706 to the low state indicates a '0' value bit.

The second timing diagram 710 illustrates five bit transmission intervals 714a-714e in a signal carried on SDATA 712. A sequence of bits {0, 0, 1, 1, 0} is transmitted in the five bit transmission intervals 714a-714e and illustrates the transitions within each of the five bit transmission intervals 714a-714e. It will be observed that transitions may occur at some boundaries between bit transmission intervals 714a-714e and that no transitions occur at the other boundaries between bit transmission intervals 714a-714e.

Control signaling provided in accordance with certain aspects of this disclosure can be used to indicate start of a datagram, clock synchronization, commencement of data exchange for both write and read datagrams and end of a datagram. Certain aspects of this disclosure relate to the generation and handling of in-band interrupt requests. In-band interrupt requests are accommodated under the control of a host device. The host device may defer, reject or ignore in-band interrupt requests, including when, for example, higher priority messages arrive for transmission over the 1-wire serial bus controlled by the host device.

The third timing diagram 720 illustrates configuration of an SSC 724, and a synchronization pattern (Sync 726) defined for basic transactions in accordance with certain aspects of this disclosure. The SSC 724 operates as a control signal that is transmitted over SDATA 722 to signal the start of a transaction or an interrupt handling procedure. The SSC 724 has the form of a pulse that is initiated when SDATA 722 is idle. In the illustrated example, SDATA 722 is in a low signaling state when idle. The SSC 724 is initiated by driving SDATA 722 to a high signaling state. The SSC 724 is terminated by driving SDATA 722 to the low signaling state. In the illustrated example, the SSC 724 has a duration of three cycles of an internal transmit clock signal 730 used by the host device to control timing of transmissions over the 1-wire serial bus.

In some implementations, the SSC 724 is separated from Sync 726 by a duration corresponding to one cycle of the internal transmit clock signal 730. Sync 726 has a duration defined by a number of cycles of the internal transmit clock signal 730. In the illustrated example, Sync 726 has a duration corresponding to two cycles of the internal transmit clock signal 730. Other implementations may specify a synchronization pattern that is defined by any number of cycles of the internal transmit clock signal 730, or by a minimum and/or a maximum number of cycles of the internal transmit clock signal 730.

Sync 726 includes synchronization pulses 732, 734 that are provided to enable clock generation circuits in receiving devices to synchronize with the internal transmit clock signal 730 used by the host device. The synchronization pulses 732, 734 can enable clock synchronization that includes frequency and phase synchronization. The number of synchronization pulses transmitted in sequence may be configured or selected based on application, receiver capabilities or under control of an application. The number of clock ticks may be selected to achieve clock frequency and phase synchronization of different types of clock generation circuits, including ring oscillators, delay locked loops and other circuits. The use of Manchester encoding permits clock phase adjustment to be performed in each bit transmission interval and can support long run datagrams without losing clock synchronization.

According to certain aspects of this disclosure, Sync 726 can be encoded with a binary value. In the illustrated example, Sync 726 is transmitted as two Manchester-encoded bits having the value '01'.

Figure 8:
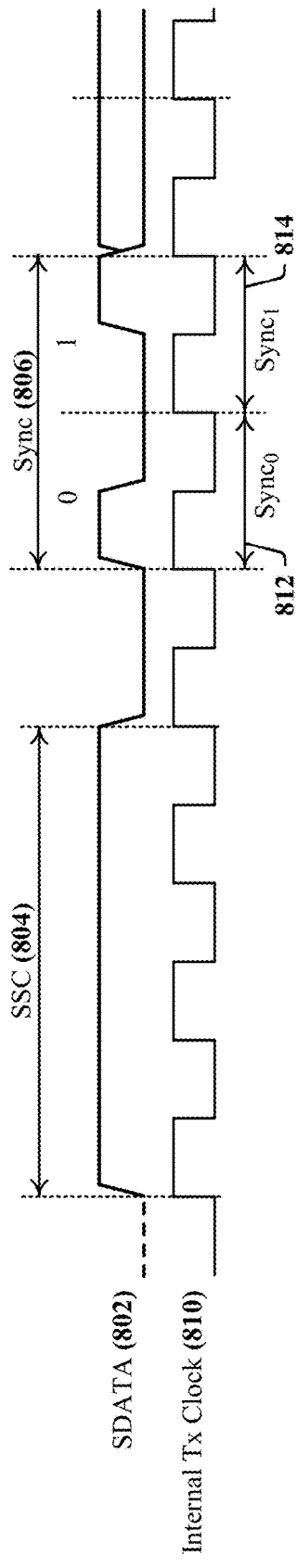
FIG. 8 illustrates examples of transaction initiation for a 1-wire serial bus in accordance with certain aspects of this disclosure.
Figure 8:
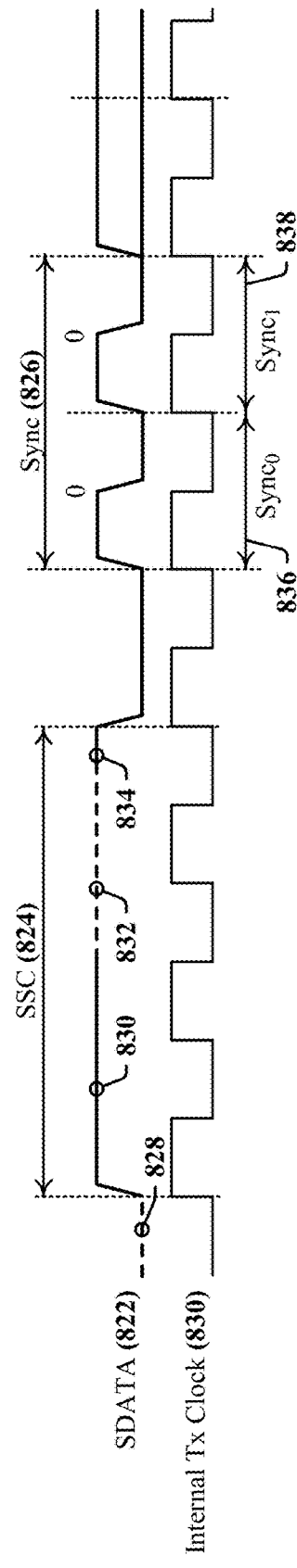

FIG. 8 illustrates initiation of transactions over a 1-wire serial bus that is configured for exception handling prompted by an in-band interrupt asserted in accordance with certain aspects of this disclosure. A first timing diagram 800 in FIG. 8 shows an example of an SSC 804 and Sync 806 that is configured to indicate a normal or standard datagram. The SSC 804 is transmitted over SDATA 802 to signal the start of a normal or standard transaction. The SSC 804 is initiated by the host device when SDATA 802 is idle. In the illustrated example, SDATA 802 is in a low signaling state when idled and the SSC 804 is initiated when the host device drives SDATA 802 to a high signaling state. The SSC 804 is terminated when the host device drives SDATA 802 to the low signaling state. In the illustrated example, the SSC 804 has a duration of three cycles of an internal transmit clock signal 810 used by the host device to control timing of transmissions over the 1-wire serial bus and is separated from Sync 806 by a duration corresponding to one cycle of the internal transmit clock signal 810.

Sync 806 has a duration that may be expressed as a number of cycles of the internal transmit clock signal 810. In the illustrated example, Sync 806 has a duration corresponding to two cycles of the internal transmit clock signal 810. Other implementations may specify a synchronization pattern that is defined by any number of cycles of the internal transmit clock signal 810, or by a minimum and/or a maximum number of cycles of the internal transmit clock signal 810. The duration of Sync 806 is typically selected to ensure that clock generation circuits in receiving devices can synchronize with the internal transmit clock signal 810 used by the host device.

In the illustrated example, Sync 806 is transmitted as two Manchester-encoded bits 812, 814 and has the combined value '01' to indicate that the Sync 806 precedes a normal or standard datagram. A normal or standard datagram may refer to a datagram that is initiated under the control of the host device. A normal or standard datagram may include a command addressed to a single subordinate device or a group of subordinate devices, or is a broadcast command to all subordinate devices. The value encoded in a multibit synchronization pattern can be defined or preconfigured such that the host device can distinguish between types of transmissions. In one example, the value encoded in a multibit synchronization pattern and its meaning can be configured during manufacture, system configuration or by application.

The second timing diagram 820 in FIG. 8 shows an example of an SSC 824 and Sync 826 that is configured to indicate an exception transaction. In this example, the SSC 824 is transmitted over SDATA 822 to signal the start of an interrupt handling procedure. The SSC 824 is initiated when SDATA 822 is idle. As illustrated for this example, SDATA 822 is in a low signaling state when idled and the SSC 824 is initiated when SDATA 822 is driven to a high signaling state. The SSC 824 is terminated when the host device drives SDATA 822 to the low signaling state.

The SSC 824 illustrated in the second timing diagram 820 may be treated as an interrupt request. One or more subordinate devices may assert and interrupt request by driving SDATA 822 to the high signaling state. With renewed reference to FIG. 6, for example, When SDATA 822 is idled, the host device 602 may cause the output its line driver 612 to enter a high-impedance state thereby causing the SDATA 620 to be weakly held low by the keeper circuit 640. The line driver 632 of the subordinate device 604$_N$ can easily overcome the keeper circuit 640 and drive SDATA 620 high.

Returning to FIG. 8, the second timing diagram 820 may represent timing associated with the device configuration illustrated in FIG. 6. The host device may be configured to monitor SDATA 822 when SDATA 822 is in an idle state 828. The host device detects that at least one subordinate device has driven SDATA 822 to the high signaling state 830. Any subordinate device asserting an interrupt request is expected to maintain SDATA 822 to the high signaling state 830 a period of time that is defined during manufacture or configured by application to ensure sufficient time to detect of the interrupt request by the host device. In the illustrated example, the interrupt asserting subordinate device continues to drive SDATA 822 high for two cycles of an internal transmit clock signal before causing its line driver to enter a high impedance state. SDATA 822 remains in the high signaling state 832 based on the weak pull of the keeper circuit. The internal transmit clock signal may be used by the host device or subordinate device to control timing of transmissions over the 1-wire serial bus. The host device and subordinate devices generate internal transmit clock signals that can be synchronized using timing provided by Manchester-encoded signals.

The host device may host device may cause the output its line driver to exit the high-impedance state and to actively maintain SDATA 822 at the high signaling state 834 before driving SDATA 822 to the low signaling state, thereby terminating the SSC 824. In the illustrated example, the SSC 824 has a duration corresponding to three cycles of the internal transmit clock signal, although the duration may be defined during manufacture or system configuration and/or selected according to application needs. In the illustrated example, the SSC 824 has a duration of three cycles of an internal transmit clock signal. After the SSC 824 has been terminated, all devices coupled to SDATA 822 interpret the transition as the start of a new datagram by the host device.

Sync 826 may follow SSC 824 after a configured or predefined delay. In the illustrated example, the delay corresponds to one cycle of the internal transmit clock signal 830. Sync 826 may have a duration that may be expressed as a number of cycles of the internal transmit clock signal 830. In the illustrated example, Sync 826 has a duration corresponding to two cycles of the internal transmit clock signal 830. Other implementations may specify a synchronization pattern that is defined by any number of cycles of the internal transmit clock signal 830, or by a minimum and/or a maximum number of cycles of the internal transmit clock signal 830. The duration of Sync 826 is typically selected to ensure that clock generation circuits in receiving devices can synchronize with the internal transmit clock signal 830 used by the host device.

In the illustrated example, Sync 826 is transmitted as two Manchester-encoded bits 836, 838 having the value '00' to indicate that the Sync 826 precedes an interrupt handling procedure. In another example, the host device may transmit a synchronization pattern as two Manchester-encoded bits having the value '01' to indicate that the synchronization pattern precedes a normal or standard datagram. In the latter example, the host device may handle interrupt requests through simple data exchange using a command code configured to initiate read or write of one or more subordinate devices. In some instances, the host device may transmit the '01' pattern when ignoring or deferring handling of the interrupt request.

The value encoded in a multibit synchronization pattern can be used by the host device to indicate different types of exception handling transactions, including hot join transactions used to assign addresses and/or priorities to subordinate devices, reset or error recovery procedures, and so on. In some instances, a multibit synchronization pattern may be assigned to indicate special transmissions of normal or standard datagrams without address to preconfigured priority target subordinate devices.

Certain aspects of this disclosure relate to interrupt request handling procedures as well as signaling and messaging formats and structures that can be used to identify subordinate devices that have requested interrupt service. In some implementations, address arbitration may be used to determine the highest priority subordinate device that is requesting interrupt service. In one example, each requesting subordinate device drives its unique device identifier (address) over the 1-wire serial bus, such that the highest priority subordinate device wins arbitration based on the configuration of bits in its unique identifier. In some implementations, arbitration procedure based on a "hand-raising" mechanism is used to identify all subordinate devices that are currently requesting interrupt service. In one example, each subordinate device coupled to the single wire bus is assigned a slot within an arbitration period and can affirmatively signal a request for interrupt service during its assigned slot. The host device can identify and record each subordinate device requesting interrupt service and can service each requesting subordinate device in accordance with device priority, queuing algorithm or based on priorities and parameters defined by an application or system configuration. In some implementations, subordinate devices that are currently requesting interrupt service can be identified by interrogation whereby the host device polls each subordinate device to determine need for interrupt servicing. In one example, the host device may poll all devices and then determine an order of servicing in accordance with device priority, a queuing algorithm or based on priorities and parameters defined by an application or system configuration. In another example, the host device may poll devices in an order determined by device priority, queuing algorithm or based on priorities and parameters defined by an application or system configuration, and can then service interrupts as soon as a device indicates a need for servicing during polling.

The host device may also delay, defer or abandon interrupt servicing at any time after detection of an interrupt request or during arbitration, polling or servicing of interrupts. The host device can retain information subordinate devices requesting interrupt service after terminating interrupt-related procedures.

Figure 9:
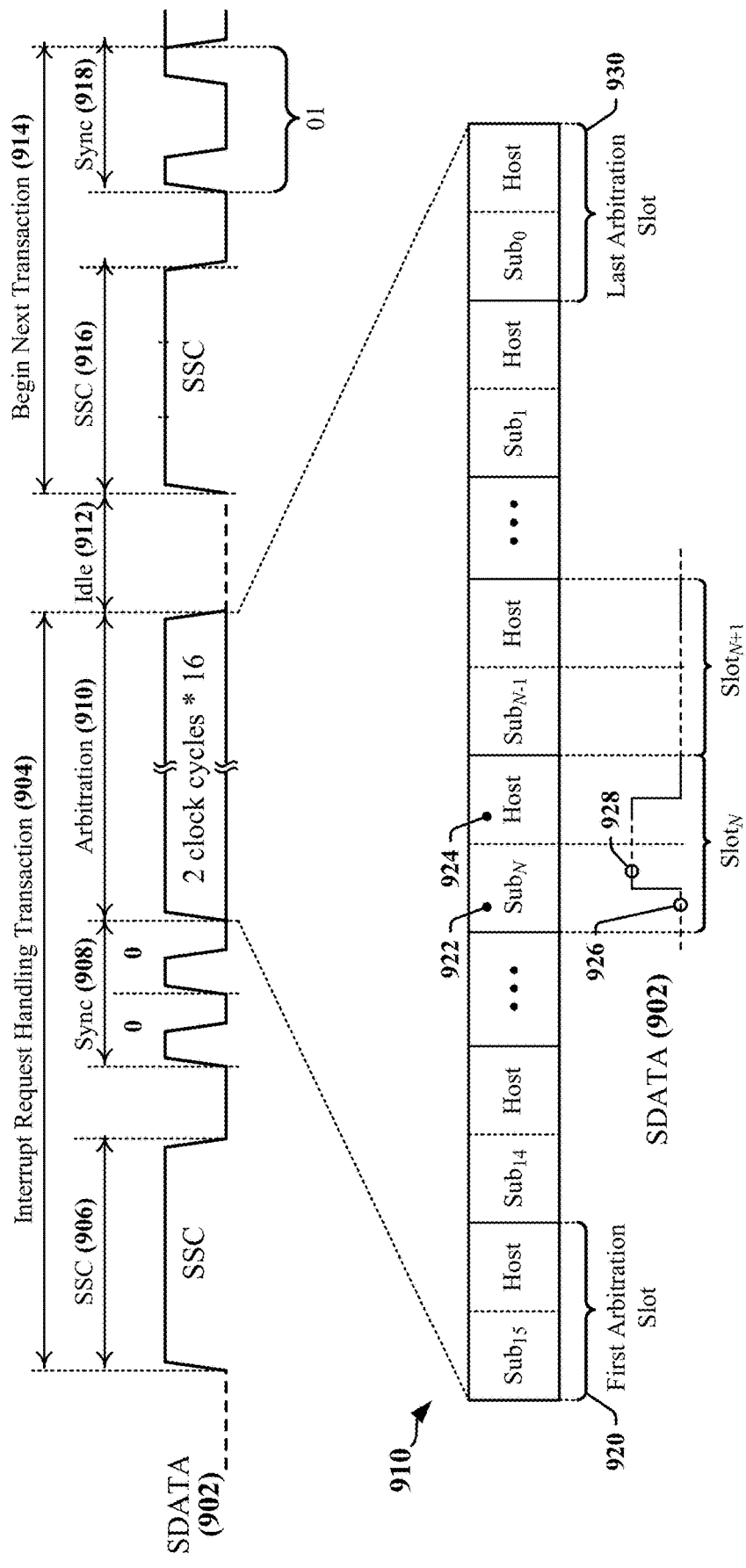
FIG. 9 illustrates a first example of an interrupt identification transaction conducted on a 1-wire serial bus configured or adapted in accordance with certain aspects of the disclosure.

FIG. 9 includes a timing diagram 900 that illustrates an arbitration slot transaction 904 conducted on a 1-wire serial bus configured or adapted in accordance with certain aspects of the disclosure. The 1-wire serial bus has an interconnect or wire (SDATA 902) configured for carrying bidirectional data between two or more devices. Consistent with the systems and signaling illustrated in FIGS. 5-8, a host device manages operation of the 1-wire serial bus by providing control signaling that can indicate, for example, start of a datagram, end of the datagram, start of an interrupt handling transaction. The host device also employs signaling and encoding techniques configured to enable clock synchronization at the subordinate devices, and to enable data exchange during read and write operations. Control signaling based on the configuration of a synchronization pattern can be used to service and accommodate interrupt requests.

In the illustrated example, an SSC 906 is provided on SDATA 902. The SSC 906 may be initiated as an interrupt request as illustrated in the second timing diagram 820 of FIG. 8, and subsequently terminated by the host device upon recognition of the presence of the signaling on SDATA 902 during an idle period. The SSC 906 may be initiated and terminated by the host device, including when deferred interrupt request processing is being initiated or as part of a series of address arbitration procedures used to identify all subordinate devices requesting interrupt service.

The host device may initiate the SSC 906 or one or more subordinate devices may drive SDATA 902 to initiate the SSC 906 during a bus idle period by driving SDATA 902 high. In instances where the SSC 906 is initiated by a subordinate device, the subordinate device may initiate the SSC 906 after SDATA 902 has been idled for a minimum period of time defined by protocol and/or preconfigured during system initialization. The subordinate device is expected to release SDATA 902 by causing its line driver coupled to SDATA 902 to present a high impedance to SDATA 902 within one clock cycle of an internally generated clock signal. The signaling of SDATA 902 may be maintained by a keeper circuit after the line driver in the subordinate device has entered high impedance mode. The host device is configured to terminate the SSC 906 by driving SDATA 902 low.

The host device may transmit a Sync 908 after terminating the SSC 906. In the illustrated example, the Sync 908 is transmitted as two Manchester-encoded bits having the value '00' to indicate that an interrupt handling procedure is being initiated. The number of the synchronization pulses transmitted in the Sync 908 may be selected or configured during manufacture, system integration, initial system configuration and/or by an application or host device. The value encoded in the Sync 1012 that indicates an interrupt service transaction is to follow may be selected or configured during manufacture, system integration, initial system configuration and/or by an application or host device.

The Sync 908 precedes an arbitration period 910. In some instances, the arbitration period 910 allocates a two-cycle arbitration slot for each subordinate device registered at the host device or coupled to the 1-wire serial bus. Arbitration slots are assigned to subordinate devices based on device addresses that uniquely identify and distinguish the subordinate devices with respect to one another. The values of the device addresses can indicate priority of the subordinate devices to which they are assigned. In one example, a subordinate device with the highest-value device address is treated as the highest priority subordinate device. In another example, a subordinate device with the lowest-value device address is treated as the highest priority subordinate device. Device addresses may be assigned during manufacture, system integration, initial system configuration and/or by an application or host device.

In the illustrated example, the arbitration period 910 accommodates 16 devices and has a duration of 32 cycles of the transmit clock signal used by the host device. In this example, the subordinate device with the highest-value device address has the highest priority device and is assigned the first arbitration slot 920 and the subordinate device with the lowest-value device address has the lowest priority device and may is the last arbitration slot 930. This configuration of arbitration slots enables the host device to terminate the arbitration slot transaction 904 after detecting a first assertion of interrupt request. Alternatively or additionally, other techniques for handling high priority interrupt requests can be facilitated through early termination of the arbitration slot transaction 904. For example, the arbitration slot transaction 904 may be terminated when the host detects assertion of interrupt request by a subordinate device that has been previously identified as a high priority participant, including when a low-priority subordinate device has previously asserted an interrupt request within the same arbitration slot transaction 904.

According to certain aspects of this disclosure, the first cycle of each arbitration slot is reserved for signaling by the subordinate device to which the slot is allocated. The second cycle of each arbitration slot is reserved for signaling by the host device. A subordinate device can participate in the bus arbitration by driving SDATA 902 high during the first cycle of its corresponding slot in the arbitration period 910. The participating subordinate device then causes its line driver to enter a high impedance state before the end of the first cycle of the slot. SDATA 902 remains in the high state due to the operation of a keeper circuit or due to the host device activating its line driver to maintain SDATA 902 in the high state for the complete first cycle. The host device drives SDATA 902 low in the second cycle of the slot to permit the next subordinate device to unambiguously signal participation in arbitration.

Timing of signals on SDATA 902 is shown for two arbitration slots, identified in FIG. 9 as slot $Slot_N$ and $Slot_{N+1}$. $Slot_N$ occurs first in time and the subordinate device allocated $Slot_N$ can assert an interrupt by driving SDATA 902 high during the first clock cycle 922 of $Slot_N$. Initially, SDATA 902 is undriven and weakly held in the low signaling state 926 by the keeper circuit. The asserting subordinate device enables its line driver and drives SDATA 902 to the high signaling state 928. The asserting subordinate device disables its line driver causing its output to enter a high impedance state. The keeper circuit weakly holds SDATA 902 in the high signaling state 928. During the second clock cycle 924 of $Slot_N$, the host device enables its line driver and drives SDATA 902 to the low signaling state 926. The host device disables its line driver causing its output to enter a high impedance state, whereby SDATA 902 is undriven and weakly held in the low signaling state 926 by the keeper circuit. $Slot_{N+1}$ occurs after Slot and the subordinate device allocated $Slot_{N+1}$ does not assert an interrupt. SDATA 902 remains undriven and weakly held in the low signaling state 926 by the keeper circuit. In some implementations, the host device may enable its line driver and actively drive SDATA 902 low before causing SDATA 902 to reenter the high impedance state.

The host device identifies each device that drove SDATA 902 high during its corresponding slot in the arbitration period 910 as a device seeking interrupt service. The host device may then schedule interrupt servicing of the participant subordinate devices in an order determined by priority or sequence configured for the system. In the event that the host device abandons the arbitration process by transmitting an 8-cycle SSC, the host device can retain the information identifying participant subordinate devices in the arbitration period 910 and may schedule interrupt servicing based on the identifying information.

The host device may idle SDATA 902 for a period of time 912 after the arbitration period 910 and before initiating a next transaction 914. SDATA 902 may be idled when the host device causes its line driver to enter a high impedance state. In the illustrated example, the next transaction 914 commences with an SSC 916 and a Sync 918. The Sync 918 is transmitted as two Manchester-encoded bits having the value '01' to indicate that a normal or standard datagram is to follow. The next transaction 914 may be executed to service one or more interrupt requests.

According to certain aspects of the disclosure, control signaling provided by the host device can indicate start of a datagram, end of the datagram, start of an interruptible transaction, and abandonment of an interrupt processing procedure (by transmitting an SSC, for example). The datagram may also be referred to as a frame or may be provided within a frame that includes arbitration or other datagrams. The control signaling provided by the host device can indicate start of frame (SoF) or end of frame (EoF). Signaling and encoding techniques can be configured to enable clock synchronization, and data exchange for both read and write operations.

Address scanning arbitration performed in accordance with certain aspects of this disclosure may be used to determine the identity of one or more subordinate device that are requesting interrupt service. Multiple subordinate devices can assert an interrupt concurrently, and each asserting device may be unaware of the actions of other asserting devices. In some instances, a subordinate device desiring to request interrupt service may refrain from initiating an SSC when another subordinate device has already initiated an SSC.

In accordance with certain aspects of this disclosure, all subordinate devices coupled to, or registered for operation on the 1-wire serial bus can participate in address scanning arbitration. Address scanning arbitration may be used to identify subordinate devices that are currently requesting or in of interrupt service. Address scanning arbitration can detect subordinate devices that initiated an SSC over the 1-wire serial bus to generate the interrupt request, subordinate devices that were preempted by another subordinate device that initiated an SSC, and subordinate devices that develop a need for interrupt service after an interrupt request has been asserted.

In one aspect, each subordinate device is addressed in turn by the host device, prompting the subordinate devices signal a request for interrupt service. This response by the subordinate devices may be referred to as a hand raise used to indicate a pending interrupt request. Hand-raising is signaled when the addressed subordinate devices toggle the 1-wire serial bus to generate a pulse that can be detected by the host device. Subordinate devices that do not need or desire interrupt service do not drive the 1-wire serial bus after their unique addresses are transmitted over the 1-wire serial bus.

Figure 10:
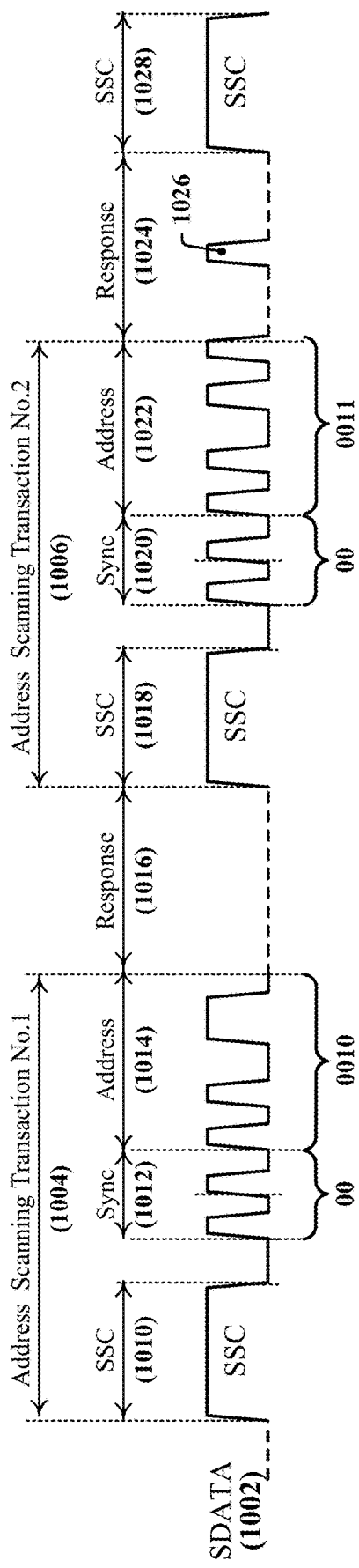
FIG. 10 illustrates a second example of an interrupt identification transaction conducted on a 1-wire serial bus configured or adapted in accordance with certain aspects of the disclosure.

FIG. 10 includes a timing diagram 1000 that illustrates address scanning arbitration that may be conducted on a 1-wire serial bus configured or adapted in accordance with certain aspects of the disclosure. The 1-wire serial bus has an interconnect or wire (SDATA 1002) configured to carry bidirectional data between two or more devices. Consistent with the systems and signaling illustrated in FIGS. 5-8, a host device manages operation of the 1-wire serial bus by providing control signaling that can indicate, for example, start of a datagram, end of the datagram or start of an interrupt handling transaction, and abandonment of an interrupt processing or arbitration procedure (e.g., by transmitting an SSC). The host device also employs signaling and encoding techniques configured to enable clock synchronization at the subordinate devices, and to enable data exchange during read and write operations.

According to certain aspects, address scanning arbitration may be initiated as an immediate response to an interrupt request asserted by one or more subordinate devices. The interrupt request may be initiated as illustrated in the second timing diagram 820 of FIG. 8, when one or more subordinate devices drives SDATA 1002 high during an idle period. The host device may drive SDATA 1002 low in order to complete an SSC. The host device may then transmit a synchronization pattern encoded to indicate that interrupt handling follows. Interrupt handling can include initiating address scanning arbitration to identify at least one subordinate device that is requesting interrupt service. Address scanning arbitration may be performed to identify all subordinate devices that are requesting interrupt service and the host device can schedule or prioritize interrupt service for the requesting subordinate devices. In some implementations, the host device may defer address scanning arbitration when, for example, high-priority messages become available for transmission by the host device. In some implementations, the host device may terminate address scanning arbitration before all subordinate devices have been addressed. Early termination may occur when a requesting subordinate device is identified as a high priority device, or other high-priority messages become available for transmission by the host device. A terminated address scanning arbitration procedure can be subsequently resumed and completed or can be restarted.

The host device may commence a deferred, resumed or restarted address scanning arbitration procedure by transmitting an SSC and synchronization pattern encoded to indicate that interrupt handling follows. Subsequent SSCs 1010, 1018, 1028 are initiated and terminated by the host device as part of a series of address arbitration transactions used to identify all subordinate devices requesting interrupt service.

The timing diagram 1000 in FIG. 10 illustrates two address scanning arbitration transactions 1004, 1006. The first address scanning arbitration transaction 1004 is directed to a subordinate device that is not requesting or desirous of interrupt service. The second address scanning arbitration transaction 1006 is directed to a subordinate device that is requesting interrupt service. For each address scanning arbitration transactions 1004, 1006, an SSC 1010, 1018 is transmitted after SDATA 1002 has been idled for a minimum period of time defined by protocol and/or preconfigured during system initialization. A synchronization pattern (Sync 1012, 1020), encoded to indicate that interrupt handling, is transmitted over SDATA 1002 after the SSCs 1010, 1018. In the illustrated example, the Sync 1012, 1020 is transmitted as two Manchester-encoded bits having the value '00' to indicate that an interrupt handling procedure is being initiated. The number of the synchronization pulses transmitted in the Sync 1012, 1020 may be selected or configured during manufacture, system integration, initial system configuration and/or by an application or host device. The value encoded in the Sync 1012, 1020 that indicates an interrupt service transaction may be selected or configured during manufacture, system integration, initial system configuration and/or by an application or host device.

The Sync 1012 is followed by an address field, consistent with the structure and configuration of read and write commands transmitted in normal transactions. The address field is encoded with the unique identifier that serves as the device address for subordinate device to be polled. A response window 1016, 1024 is provided for transmission of a response by the addressed subordinate device. The host device causes the output of its line driver to enter a high-impedance state during response windows 1016, 1024. The response windows 1016, 1024 may have a duration calculated to ensure that the least capable subordinate device can respond to a poll. In one example the response windows 1016, 1024 have a duration of at least three transmit clock cycles. An upper limit may be defined for the duration of the response windows 1016, 1024 based on the number of transmit clock cycles that are defined as a minimum idle time before an interrupt can be asserted.

In the example of the first address scanning arbitration transaction 1004, the subordinate device that responds to the address 1022 (here 0b0010) does not respond. In the example of the second address scanning arbitration transaction 1004, the subordinate device that responds to the address 1014 (here 0b0011) transmits a pulse 1026 within the response window 1024. The third SSC 1028 may be transmitted to start a third address scanning arbitration transaction or to initiate a normal read or write transaction that may for example, be transmitted as part of interrupt servicing for one or more subordinate devices.

In some implementations, a modified address scanning arbitration procedure may be performed using a normal read transaction. In these implementations, the host device may read interrupt request status from a register located at an address defined by protocol or configuration.

Figure 11:
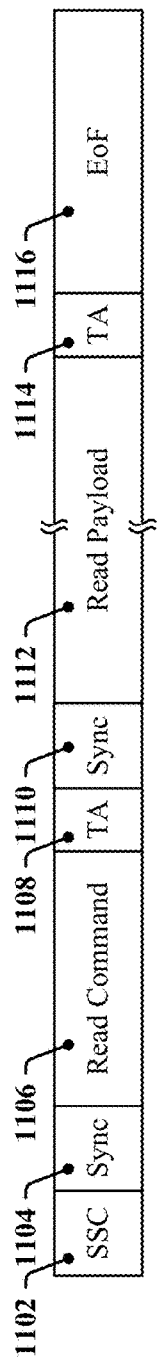
FIG. 11 illustrates a read transaction executed on a 1-wire serial bus configured in accordance with certain aspects disclosed herein.

FIG. 11 illustrates a read transaction 1100 executed on a 1-wire serial bus configured in accordance with certain aspects disclosed herein. The read transaction 1100 may be specified by protocol for use in normal communication between a host device and one or more subordinate devices. In accordance with certain aspects of this disclosure, the read transaction 1100 may also by a host device to handle interrupts. For example, the host device may read one or more registers in the subordinate devices to determine whether interrupt servicing is requested. The registers may be defined by protocol or configuration and may indicate interrupt request status directly or may indicate status or changes of status that would have prompted an interrupt request.

The host device may transmit synchronization bits in a Sync 1104 field after an SSC 1102 to indicate a normal transaction is to follow. In one example, the synchronization bits carry is Manchester encoded and carry a value indicative of a normal transaction. The synchronization bits can be used by the receiving device to synchronize its local clock generation circuit. A read command 1106 is transmitted to a subordinate device. The read command 1106 may have a structure and content compatible or compliant with one or more commands defined by RFFE protocols. The read command 1106 may be encoded using Manchester encoding.

The host device provides a turnaround period 1108 during which the host device causes its line driver to enter a high impedance state and a subordinate device addressed by the read command 1106 activates its line driver. In one example, the turnaround period 1108 includes two cycles of the transmit clock signal. The host device is configured to disable its line driver in the first clock cycle of the turnaround period 1108, and the addressed subordinate device is configured to enable its line driver in the second clock cycle of the turnaround period 1108. The subordinate device transmits synchronization pulses 1110 that can be used by the host device to synchronize its transmit clock generation circuit to the local clock generation circuit of the addressed subordinate device. The subordinate device then transmits a payload 1112. The payload 1112 may be encoded using Manchester encoding.

A second turnaround period 1114 is provided. During the second turnaround period 1114, the subordinate device addressed by the read command 1106 causes its line driver to enter a high impedance state and the host device activates its line driver. In one example, the turnaround period 1114 includes two cycles of the transmit clock signal and the addressed subordinate device is configured to disable its line driver in the first clock cycle and the host is configured to enable its line driver in the second clock cycle. The read transaction 1100 is terminated by an EoF 1116. In some instances, the EoF 1116 may be indicated by SDATA being idle for a number of cycles. In one example, the EoF 1116 is indicated when SDATA is idle for 7 cycles of the transmit clock.

In the various examples provided herein, the example of a 1-wire serial bus is described in which data and commands are configured in accordance with an RFFE protocol. The RFFE protocol is used to illustrate certain aspects of the disclosure. The 1-wire serial bus may be operated in accordance with a different type of serial multidrop protocol, including an SPMI protocol or an I3C protocol, for example. Certain aspects of the serial multidrop protocol selected to control and manage transmissions over the 1-wire serial bus may be adapted, configured or modified to support arbitration, line turnaround and transmissions executed without an explicit clock reference such as a clock signal transmitted on a dedicated clock wire.

Examples of Processing Circuits and Methods

Figure 12:
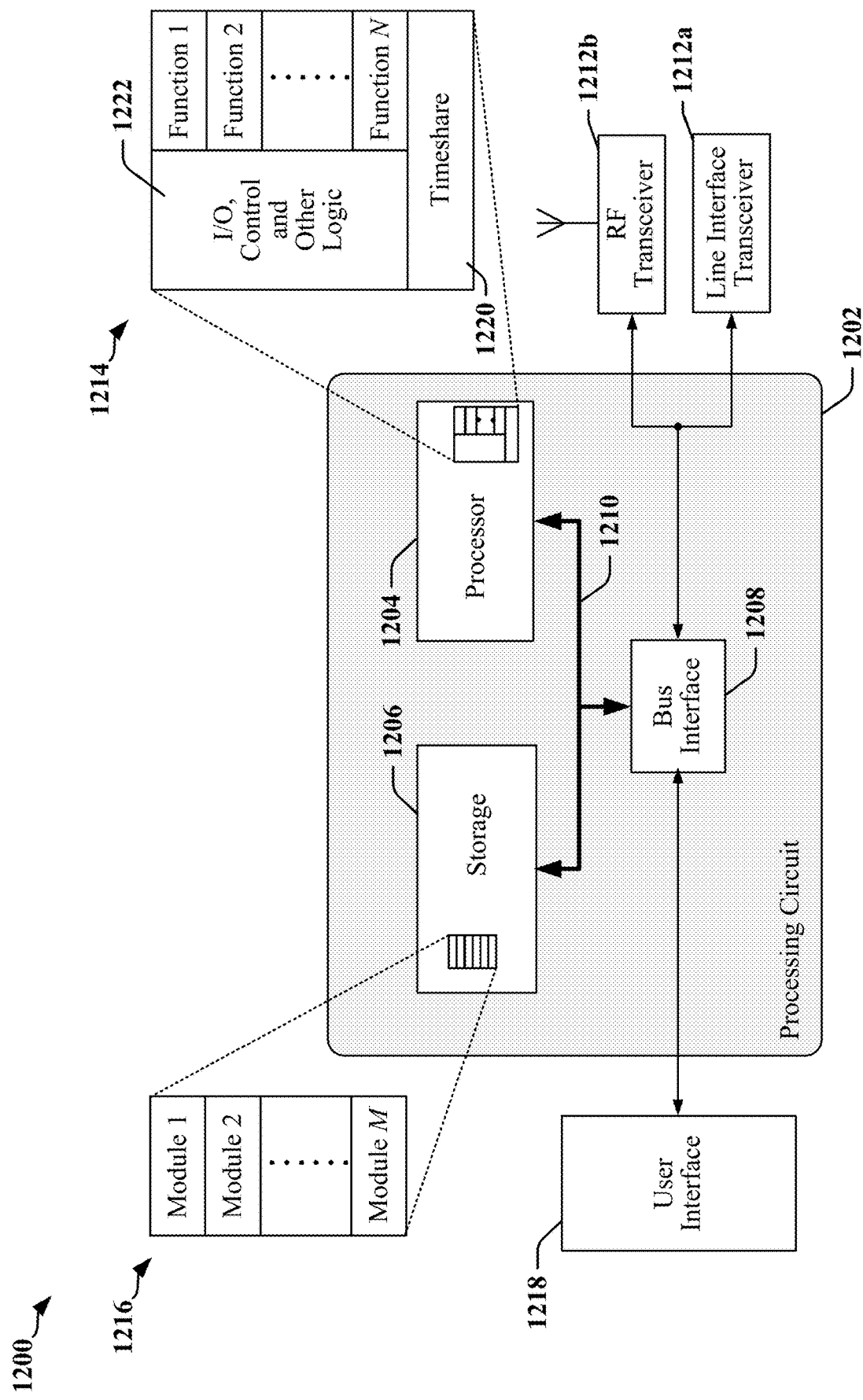
FIG. 12 illustrates one example of an apparatus employing a processing circuit that may be adapted according to certain aspects disclosed herein.

FIG. 12 is a diagram illustrating an example of a hardware implementation for an apparatus 1200. In some examples, the apparatus 1200 may perform one or more functions disclosed herein. In accordance with various aspects of the disclosure, an element, or any portion of an element, or any combination of elements as disclosed herein may be implemented using a processing circuit 1202. The processing circuit 1202 may include one or more processors 1204 that are controlled by some combination of hardware and software modules. Examples of processors 1204 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1204 may include specialized processors that perform specific functions, and that may be configured, augmented or controlled by one of the software modules 1216. The one or more processors 1204 may be configured through a combination of software modules 1216 loaded during initialization, and further configured by loading or unloading one or more software modules 1216 during operation.

In the illustrated example, the processing circuit 1202 may be implemented with a bus architecture, represented generally by the bus 1210. The bus 1210 may include any number of interconnecting buses and bridges depending on the specific application of the processing circuit 1202 and the overall design constraints. The bus 1210 links together various circuits including the one or more processors 1204, and storage 1206. Storage 1206 may include memory devices and mass storage devices, and may be referred to herein as computer-readable media and/or processor-readable media. The bus 1210 may also link various other circuits such as timing sources, timers, peripherals, voltage regulators, and power management circuits. A bus interface 1208 may provide an interface between the bus 1210 and one or more transceivers 1212*a*, 1212*b*. A transceiver 1212*a*, 1212*b* may be provided for each networking technology supported by the processing circuit. In some instances, multiple networking technologies may share some or all of the circuitry or processing modules found in a transceiver 1212*a*, 1212*b*. Each transceiver 1212*a*, 1212*b* provides a means for communicating with various other apparatus over a transmission medium. In one example, a transceiver 1212*a* may be used to couple the apparatus 1200 to a multi-wire bus. In another example, a transceiver 1212*b* may be used to connect the apparatus 1200 to a radio access network. Depending upon the nature of the apparatus 1200, a user interface 1218 (e.g., keypad, display, speaker, microphone, joystick) may also be provided, and may be communicatively coupled to the bus 1210 directly or through the bus interface 1208.

A processor 1204 may be responsible for managing the bus 1210 and for general processing that may include the execution of software stored in a computer-readable medium that may include the storage 1206. In this respect, the processing circuit 1202, including the processor 1204, may be used to implement any of the methods, functions and techniques disclosed herein. The storage 1206 may be used for storing data that is manipulated by the processor 1204 when executing software, and the software may be configured to implement any one of the methods disclosed herein.

One or more processors 1204 in the processing circuit 1202 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1206 or in an external computer-readable medium. The external computer-readable medium and/or storage 1206 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1206 may also include, by way of example, a carrier wave, a transmission line, and any other suitable medium for transmitting software and/or instructions that may be accessed and read by a computer. Computer-readable medium and/or the storage 1206 may reside in the processing circuit 1202, in the processor 1204, external to the processing circuit 1202, or be distributed across multiple entities including the processing circuit 1202. The computer-readable medium and/or storage 1206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1206 may maintain software maintained and/or organized in loadable code segments, modules, applications, programs, etc., which may be referred to herein as software modules 1216. Each of the software modules 1216 may include instructions and data that, when installed or loaded on the processing circuit 1202 and executed by the one or more processors 1204, contribute to a run-time image 1214 that controls the operation of the one or more processors 1204. When executed, certain instructions may cause the processing circuit 1202 to perform functions in accordance with certain methods, algorithms and processes described herein.

Some of the software modules 1216 may be loaded during initialization of the processing circuit 1202, and these software modules 1216 may configure the processing circuit 1202 to enable performance of the various functions disclosed herein. For example, some software modules 1216 may configure internal devices and/or logic circuits 1222 of the processor 1204, and may manage access to external devices such as a transceiver 1212a, 1212b, the bus interface 1208, the user interface 1218, timers, mathematical coprocessors, and so on. The software modules 1216 may include a control program and/or an operating system that interacts with interrupt handlers and device drivers, and that controls access to various resources provided by the processing circuit 1202. The resources may include memory, processing time, access to a transceiver 1212a, 1212b, the user interface 1218, and so on.

One or more processors 1204 of the processing circuit 1202 may be multifunctional, whereby some of the software modules 1216 are loaded and configured to perform different functions or different instances of the same function. The one or more processors 1204 may additionally be adapted to manage background tasks initiated in response to inputs from the user interface 1218, the transceiver 1212a, 1212b, and device drivers, for example. To support the performance of multiple functions, the one or more processors 1204 may be configured to provide a multitasking environment, whereby each of a plurality of functions is implemented as a set of tasks serviced by the one or more processors 1204 as needed or desired. In one example, the multitasking environment may be implemented using a timesharing program 1220 that passes control of a processor 1204 between different tasks, whereby each task returns control of the one or more processors 1204 to the timesharing program 1220 upon completion of any outstanding operations and/or in response to an input such as an interrupt. When a task has control of the one or more processors 1204, the processing circuit is effectively specialized for the purposes addressed by the function associated with the controlling task. The timesharing program 1220 may include an operating system, a main loop that transfers control on a round-robin basis, a function that allocates control of the one or more processors 1204 in accordance with a prioritization of the functions, and/or an interrupt driven main loop that responds to external events by providing control of the one or more processors 1204 to a handling function.

The processing circuit 1202 may be configured to perform one or more of the functions disclosed herein. For example, the processing circuit 1202 may be configured to operate as a master device coupled to a serial bus. The processing circuit 1202 may be configured to initiate a pulse on a wire coupling the processing circuit 1202 to a subordinate device, present a high impedance to the wire after initiating the pulse and determine whether a subordinate device has terminated the pulse early, indicating a first encoded value. When the subordinate device has not terminated the pulse, processing circuit 1202 may be configured to terminate the pulse after a duration of time sufficient to indicate a second encoded value. In one example, the first encoded value is assigned binary 1 and the second encoded value is assigned binary 0. In another example, the first encoded value is assigned binary 0 and the second encoded value is assigned binary 1. The processing circuit 1202 may be configured to determine the encoded value or may employ a separate PWM decoder.

Figure 13:
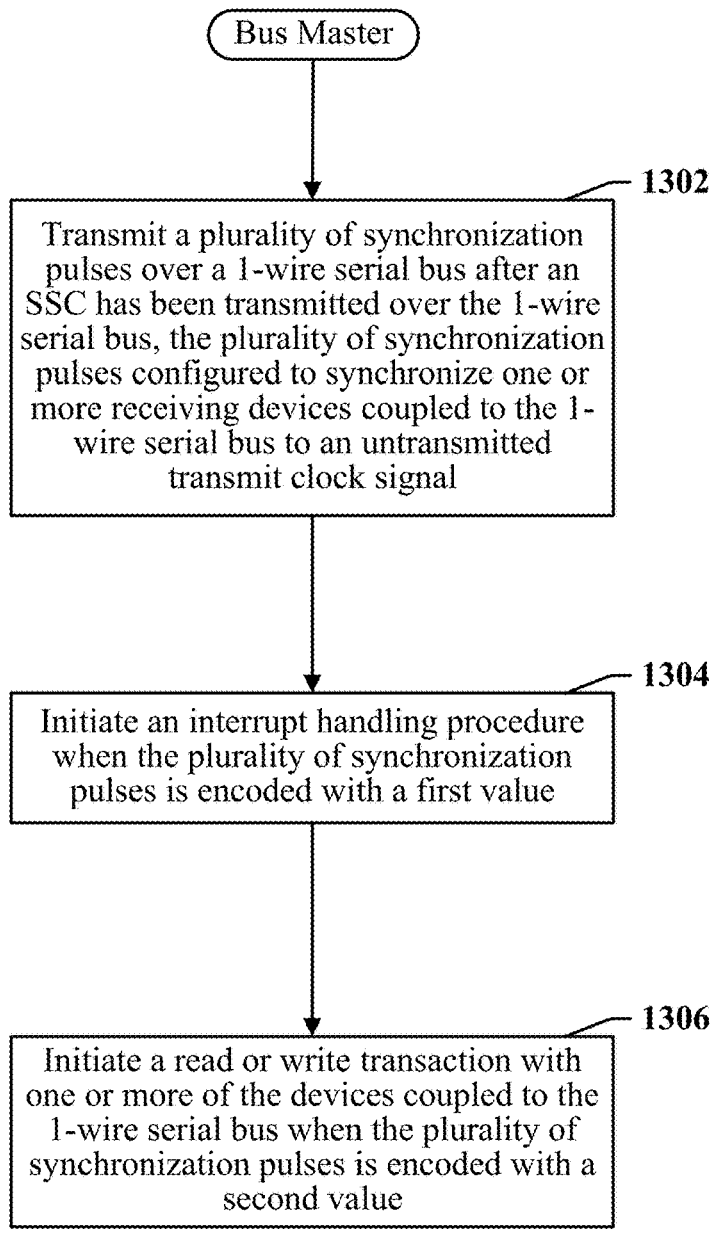
FIG. 13 is a first flowchart that illustrates a method for data communication at a host device in accordance with certain aspects disclosed herein.

FIG. 13 is a flowchart 1300 of a method of data communication that may be performed at a host device coupled to a 1-wire serial bus. One or more subordinate devices may be coupled to the 1-wire serial bus. The host device may exchange Manchester-encoded data with subordinate devices. The host device may transmit Manchester-encoded commands to the subordinate devices. At block 1302, the host device may transmit a plurality of synchronization pulses over a 1-wire serial bus after a sequence SSC has been transmitted over the 1-wire serial bus, the plurality of synchronization pulses configured to synchronize one or more receiving devices coupled to the 1-wire serial bus to an untransmitted transmit clock signal. At block 1304, the host device may initiate an interrupt handling procedure when the plurality of synchronization pulses is encoded with a first value. At block 1306, the host device may initiate a read transaction or a write transaction with at least one of the one or more receiving devices coupled to the 1-wire serial bus when the plurality of synchronization pulses is encoded with a second value. The plurality of synchronization pulses may be encoded using Manchester encoding.

In some instances, the host device may determine that the SSC has been initiated when the 1-wire serial bus transitions from a first signaling state to a second signaling state, and may terminate the SSC by causing a line driver in the host device to drive the 1-wire serial bus from the second signaling state to the first signaling state.

In some implementations, the host device may initiate the interrupt handling procedure by causing a line driver in the host device to present a high impedance to the 1-wire serial bus after transmitting the plurality of synchronization pulses after driving the 1-wire serial bus transitions to a first signaling state. Timeslots may be defined or configured to have a duration corresponding to two cycles of an untransmitted transmit clock signal. For each timeslot, the host device may cause the line driver to present high impedance to the 1-wire serial bus before the each timeslot commences, determine whether the 1-wire serial bus transitions from the first signaling state to a second signaling state during a first cycle of the each timeslot, determine that a subordinate device associated with the each timeslot is requesting interrupt service when the 1-wire serial bus transitions from the first signaling state to the second signaling state during the first cycle of the each timeslot, and cause the line driver to drive the 1-wire serial bus from the second signaling state to the first signaling state during a second cycle of the each timeslot when the 1-wire serial bus transitions from the first signaling state to the second signaling state during the first cycle of the each timeslot.

In some implementations, the host device may initiate the interrupt handling procedure by transmitting a device address over the 1-wire serial bus after transmitting the plurality of synchronization pulses, causing a line driver in the host device to present a high impedance to the 1-wire serial bus after transmitting the device address, and determining that a subordinate device associated with the device address is requesting interrupt service when a pulse is received from the 1-wire serial bus during a period that corresponds to a configured number of cycles of the transmit clock signal.

In some examples, the host device may schedule interrupt service for one or more subordinate devices determined to be requesting interrupt service during the interrupt handling procedure.

In some examples, the host device may transmit a Manchester encoded data payload over the 1-wire serial bus after initiating the write transaction. The host device may receive a Manchester encoded data payload over the 1-wire serial bus after initiating the read transaction. The read transaction or the write transaction may be formatted in accordance with RFFE protocols.

Figure 14:
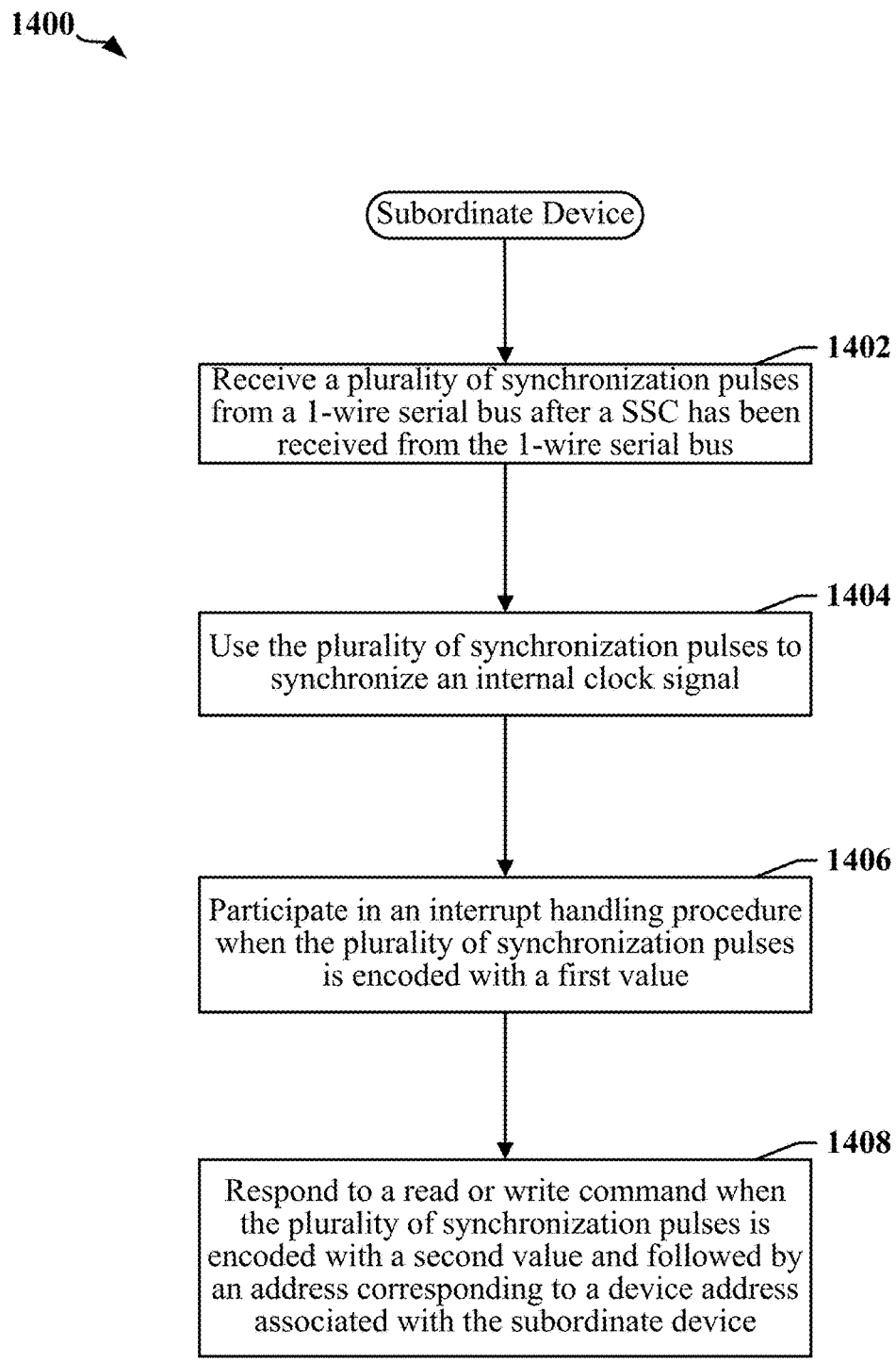
FIG. 14 is a second flowchart that illustrates a method for data communication at a bus subordinate device in accordance with certain aspects disclosed herein.

FIG. 14 is a flowchart 1400 of a method that may be performed by a subordinate device coupled to a 1-wire serial bus. One or more subordinate devices may be coupled to the 1-wire serial bus. The subordinate devices may receive Manchester-encoded commands from the host device and may exchange Manchester-encoded data with the host device in response to the commands.

At block 1402, the subordinate device may receive a plurality of synchronization pulses from a 1-wire serial bus after an SSC has been received from the 1-wire serial bus. At block 1404, the subordinate device may use the plurality of synchronization pulses to synchronize an internal clock signal. At block 1406, the subordinate device may participate in an interrupt handling procedure when the plurality of synchronization pulses is encoded with a first value. At block 1408, the subordinate device may respond to a read or write command when the plurality of synchronization pulses is encoded with a second value and followed by an address corresponding to a device address associated with the subordinate device. The plurality of synchronization pulses may be encoded using Manchester encoding.

In some instances, the subordinate device may initiate the SSC by driving the 1-wire serial bus from a first signaling state to a second signaling state, and may present a high impedance to the 1-wire serial bus after initiating the pulse.

In certain implementations, participating the interrupt handling procedure includes requesting interrupt service by driving the 1-wire serial bus from the first signaling state to the second signaling state in a timeslot associated with the subordinate device. The timeslot may be one of a plurality of timeslots. A device address associated with the subordinate device may determine location in time of the timeslot within the plurality of timeslots.

In certain implementations, participating the interrupt handling procedure includes receiving a device address over the 1-wire serial bus after the plurality of synchronization pulses is received, and requesting interrupt service by transmitting a pulse over the 1-wire serial bus when the device address is associated with the subordinate device.

In certain implementations, responding to the read or write command includes transmitting or receiving a Manchester encoded data payload over the 1-wire serial bus.

Figure 15:
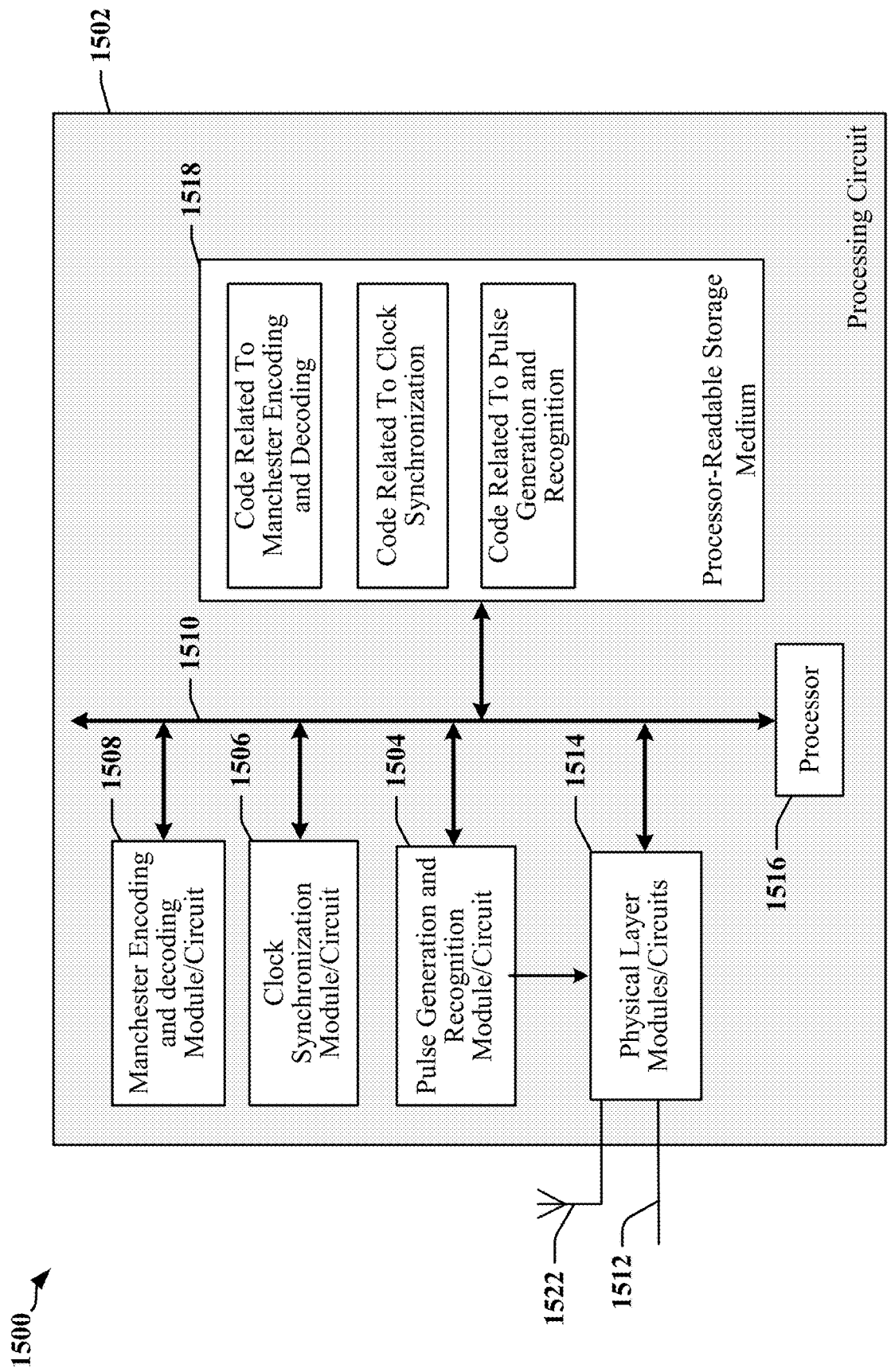
FIG. 15 illustrates an example of a hardware implementation for an apparatus adapted in accordance with certain aspects disclosed herein.

FIG. 15 is a diagram illustrating an example of a hardware implementation for an apparatus 1500 employing a processing circuit 1502. The processing circuit typically has a controller or processor 1516 that may include one or more microprocessors, microcontrollers, digital signal processors, sequencers and/or state machines. The processing circuit 1502 may be implemented with a bus architecture, represented generally by the bus 1510. The bus 1510 may include any number of interconnecting buses and bridges depending on the specific application of the processing circuit 1502 and the overall design constraints. The bus 1510 links together various circuits including one or more processors and/or hardware modules, represented by the controller or processor 1516, the modules or circuits 1504, 1506 and 1508 and the processor-readable storage medium 1518. One or more physical layer circuits and/or modules 1514 may be provided to support communication over a communication link implemented using a multi-wire bus 1512, through an antenna or antenna array 1522 (to a radio access network for example), and so on. The bus 1510 may also link various other circuits such as timing sources, peripherals, voltage regulators, and power management circuits, which are well known in the art, and therefore, will not be described any further.

The processor 1516 is responsible for general processing, including the execution of software, code and/or instructions stored on the processor-readable storage medium 1518. The processor-readable storage medium 1518 may include a non-transitory storage medium. The software, when executed by the processor 1516, causes the processing circuit 1502 to perform the various functions described herein, and for any particular apparatus. The processor-readable storage medium 1518 may be used for storing data that is manipulated by the processor 1516 when executing software. The processing circuit 1502 further includes at least one of the modules 1504, 1506 and 1508. The modules 1504, 1506 and 1508 may be software modules running in the processor 1516, resident/stored in the processor-readable storage medium 1518, one or more hardware modules coupled to the processor 1516, or some combination thereof. The modules 1504, 1506 and 1508 may include microcontroller instructions, state machine configuration parameters, or some combination thereof.

In one configuration, the apparatus 1500 includes modules and/or circuits 1504 adapted to generate and process different types of SSCs and synchronization pulses, modules and/or circuits 1506 adapted to synchronize an internal clock signal based on synchronization pulses and transitions in Manchester-encoded data or commands, and modules and/or circuits 1508 adapted to encode and decode data and commands using Manchester encoding.

In one example, the apparatus 1500 includes physical layer circuits and/or modules 1514 that implement an interface circuit with at least one line driver adapted or configured to couple the apparatus 1500 to a 1-wire serial bus. The apparatus 1500 may have a processor 1516 or protocol controller. The apparatus 1500 may include or be coupled to a keeper circuit through the 1-wire serial bus. The keeper circuit may be operable to maintain the 1-wire serial bus at a constant signaling state after the line driver in the host device and subordinate devices present a high impedance to the 1-wire serial bus.

In a first example, the processor 1516 or protocol controller is configured to transmit a plurality of synchronization pulses over a 1-wire serial bus after an SSC has been transmitted over the 1-wire serial bus, the plurality of synchronization pulses being configured to synchronize one or more receiving devices coupled to the 1-wire serial bus to an untransmitted transmit clock signal. The processor 1516 or protocol controller may be further configured to initiate an interrupt handling procedure when the plurality of synchronization pulses is encoded with a first value, and initiate a read transaction or a write transaction with at least one of the one or more receiving devices coupled to the 1-wire serial bus when the plurality of synchronization pulses is encoded with a second value. The plurality of synchronization pulses may be encoded using Manchester encoding.

The processor 1516 or protocol controller may be further configured to determine that the SSC has been initiated when the 1-wire serial bus transitions from a first signaling state to a second signaling state, and to terminate the SSC by causing a line driver in the host device to drive the 1-wire serial bus from the second signaling state to the first signaling state.

The processor 1516 or protocol controller may be further configured to cause a line driver in the apparatus 1500 to present a high impedance to the 1-wire serial bus after transmitting the plurality of synchronization pulses after driving the 1-wire serial bus transitions to a first signaling state. A timeslot may be configured with two cycles of the transmit clock signal. For each timeslot with a duration corresponding to a pair of cycles of the transmit clock signal, the processor 1516 or protocol controller may cause the line driver to present high impedance to the 1-wire serial bus before the each timeslot commences, determine whether the 1-wire serial bus transitions from the first signaling state to a second signaling state during a first cycle of the each timeslot, determine that a subordinate device associated with the each timeslot is requesting interrupt service when the 1-wire serial bus transitions from the first signaling state to the second signaling state during the first cycle of the each timeslot, and cause the line driver to drive the 1-wire serial bus from the second signaling state to the first signaling state during a second cycle of the each timeslot when the 1-wire serial bus transitions from the first signaling state to the second signaling state during the first cycle of the each timeslot.

The processor 1516 or protocol controller may be further configured to transmit a device address over the 1-wire serial bus after transmitting the plurality of synchronization pulses, cause a line driver in the apparatus 1500 to present a high impedance to the 1-wire serial bus after transmitting the device address, and determine that a subordinate device associated with the device address is requesting interrupt service when a pulse is received from the 1-wire serial bus during a period that corresponds to a configured number of cycles of the transmit clock signal.

The processor 1516 or protocol controller may be further configured to schedule interrupt service for one or more subordinate devices determined to be requesting interrupt service.

The processor 1516 or protocol controller may be further configured to transmit a Manchester encoded data payload over the 1-wire serial bus after initiating the write transaction. The processor 1516 or protocol controller may receive a Manchester encoded data payload over the 1-wire serial bus after initiating the read transaction. The read transaction or the write transaction may be formatted in accordance with an RFFE protocol.

In a second example, the processor 1516 or protocol controller is configured to receive a plurality of synchronization pulses from a 1-wire serial bus after a SSC has been received from the 1-wire serial bus, use the plurality of synchronization pulses to synchronize an internal clock signal, participate in an interrupt handling procedure when the plurality of synchronization pulses is encoded with a first value, and respond to a read or write command when the plurality of synchronization pulses is encoded with a second value and followed by an address corresponding to a device address associated with the subordinate device. The plurality of synchronization pulses may be encoded using Manchester encoding.

In certain implementations, the processor 1516 or protocol controller is further configured to initiate the SSC by driving the 1-wire serial bus from a first signaling state to a second signaling state, and to present a high impedance to the 1-wire serial bus after initiating the pulse.

In certain implementations, the processor 1516 or protocol controller is further configured to request interrupt service by driving the 1-wire serial bus from the first signaling state to the second signaling state in a timeslot associated with the subordinate device. The timeslot may be one of a plurality of timeslots, and a device address associated with the subordinate device may determine location in time of the timeslot within the plurality of timeslots.

In certain implementations, the processor 1516 or protocol controller is further configured to receive a device address over the 1-wire serial bus after the plurality of synchronization pulses is received, and to request interrupt service by transmitting a pulse over the 1-wire serial bus when the device address is associated with the subordinate device.

In certain implementations, the processor 1516 or protocol controller is further configured to transmit or receive a Manchester encoded data payload over the 1-wire serial bus.

Some implementation examples are described in the following numbered clauses:

1. A method of data communication performed at a host device, comprising: transmitting a plurality of synchronization pulses over a 1-wire serial bus after a sequence start condition (SSC) has been transmitted over the 1-wire serial bus, the plurality of synchronization pulses being configured to synchronize one or more receiving devices coupled to the 1-wire serial bus to an untransmitted transmit clock signal; initiating an interrupt handling procedure when the plurality of synchronization pulses is encoded with a first value; and initiating a read transaction or a write transaction with at least one of the one or more receiving devices coupled to the 1-wire serial bus when the plurality of synchronization pulses is encoded with a second value.

2. The method as described in clause 1, wherein the plurality of synchronization pulses is encoded using Manchester encoding.
3. The method as described in clause 1 or clause 2, further comprising: determining that the SSC has been initiated when the 1-wire serial bus transitions from a first signaling state to a second signaling state; and terminating the SSC by causing a line driver in the host device to drive the 1-wire serial bus from the second signaling state to the first signaling state.
4. The method as described in any of clauses 1-3, wherein initiating the interrupt handling procedure comprises: causing a line driver in the host device to present a high impedance to the 1-wire serial bus after transmitting the plurality of synchronization pulses after driving the 1-wire serial bus to a first signaling state; and for each timeslot comprising a pair of cycles of the transmit clock signal: causing the line driver to present the high impedance to the 1-wire serial bus before the each timeslot commences; determining whether the 1-wire serial bus transitions from the first signaling state to a second signaling state during a first cycle of the each timeslot; determining that a subordinate device associated with the each timeslot is requesting interrupt service when the 1-wire serial bus transitions from the first signaling state to the second signaling state during the first cycle of the each timeslot; and causing the line driver to drive the 1-wire serial bus from the second signaling state to the first signaling state during a second cycle of the each timeslot when the 1-wire serial bus transitions from the first signaling state to the second signaling state during the first cycle of the each timeslot.
5. The method as described in any of clauses 1-3, wherein initiating the interrupt handling procedure comprises: transmitting a device address over the 1-wire serial bus after transmitting the plurality of synchronization pulses; causing a line driver in the host device to present a high impedance to the 1-wire serial bus after transmitting the device address; and determining that a subordinate device associated with the device address is requesting interrupt service when a pulse is received from the 1-wire serial bus during a period comprising a configured number of cycles of the transmit clock signal.
6. The method as described in any of clauses 1-5, further comprising: scheduling interrupt service for one or more subordinate devices determined to be requesting interrupt service during the interrupt handling procedure.
7. The method as described in any of clauses 1-5, further comprising: transmitting a Manchester encoded data payload over the 1-wire serial bus after initiating the write transaction.
8. The method as described in any of clauses 1-5, further comprising: receiving a Manchester encoded data payload over the 1-wire serial bus after initiating the read transaction.
9. The method as described in any of clauses 1-8, wherein the read transaction or the write transaction is formatted in accordance with a Radio Frequency Front-End (RFFE) protocol.
10. A data communication apparatus, comprising: a line driver configured to couple the data communication apparatus to a 1-wire serial bus; and a controller configured to: transmit a plurality of synchronization pulses over the 1-wire serial bus after a sequence start condition (SSC) has been transmitted over the 1-wire serial bus, the plurality of synchronization pulses being configured to synchronize one or more receiving devices coupled to the 1-wire serial bus to an untransmitted transmit clock signal; initiate an interrupt handling procedure when the plurality of synchronization pulses is encoded with a first value; and initiate a read transaction or a write transaction with at least one of the one or more receiving devices coupled to the 1-wire serial bus when the plurality of synchronization pulses is encoded with a second value.
11. The data communication apparatus as described in clause 10, wherein the plurality of synchronization pulses is encoded using Manchester encoding.
12. The data communication apparatus as described in clause 10 or clause 11, wherein the controller is further configured to: determine that the SSC has been initiated when the 1-wire serial bus transitions from a first signaling state to a second signaling state; and terminate the SSC by causing the line driver to drive the 1-wire serial bus from the second signaling state to the first signaling state.
13. The data communication apparatus as described in any of clauses 10-12, wherein the controller is further configured to: cause the line driver to present a high impedance to the 1-wire serial bus after transmitting the plurality of synchronization pulses after driving the 1-wire serial bus to a first signaling state; and for each timeslot comprising a pair of cycles of the transmit clock signal: cause the line driver to present the high impedance to the 1-wire serial bus before the each timeslot commences; determine whether the 1-wire serial bus transitions from the first signaling state to a second signaling state during a first cycle of the each timeslot; determine that a subordinate device associated with the each timeslot is requesting interrupt service when the 1-wire serial bus transitions from the first signaling state to the second signaling state during the first cycle of the each timeslot; and cause the line driver to drive the 1-wire serial bus from the second signaling state to the first signaling state during a second cycle of the each timeslot when the 1-wire serial bus transitions from the first signaling state to the second signaling state during the first cycle of the each timeslot.
14. The data communication apparatus as described in any of clauses 10-12, wherein the controller is further configured to: transmit a device address over the 1-wire serial bus after transmitting the plurality of synchronization pulses; cause the line driver in the data communication apparatus to present a high impedance to the 1-wire serial bus after transmitting the device address; and determine that a subordinate device associated with the device address is requesting interrupt service when a pulse is received from the 1-wire serial bus during a period comprising a configured number of cycles of the transmit clock signal.
15. The data communication apparatus as described in any of clauses 10-14, wherein the controller is further configured to: schedule interrupt service for one or more subordinate devices determined to be requesting interrupt service.
16. The data communication apparatus as described in any of clauses 10-15, wherein the controller is further configured to transmit a Manchester encoded data payload over the 1-wire serial bus after initiating the write transaction.

17. The data communication apparatus as described in any of clauses 10-16, wherein the controller is further configured to receive a Manchester encoded data payload over the 1-wire serial bus after initiating the read transaction.
18. The data communication apparatus as described in any of clauses 10-17, wherein the read transaction or the write transaction is formatted in accordance with a Radio Frequency Front-End (RFFE) protocol.
19. A method of data communication performed at a subordinate device, comprising: receiving a plurality of synchronization pulses from a 1-wire serial bus after a sequence start condition (SSC) has been received from the 1-wire serial bus; using the plurality of synchronization pulses to synchronize an internal clock signal; participating in an interrupt handling procedure when the plurality of synchronization pulses is encoded with a first value; and responding to a read or write command when the plurality of synchronization pulses is encoded with a second value and followed by an address corresponding to a device address associated with the subordinate device.
20. The method as described in clause 19, wherein the plurality of synchronization pulses is encoded using Manchester encoding.
21. The method as described in clause 19 or clause 20, further comprising: initiating the SSC by driving the 1-wire serial bus from a first signaling state to a second signaling state; and presenting a high impedance to the 1-wire serial bus after initiating the SSC.
22. The method as described in any of clauses 19-21, wherein participating in the interrupt handling procedure comprises: requesting interrupt service by driving the 1-wire serial bus from a first signaling state to a second signaling state in a timeslot associated with the subordinate device, wherein the timeslot is one of a plurality of timeslots, and wherein the device address associated with the subordinate device determines location in time of the timeslot within the plurality of timeslots.
23. The method as described in any of clauses 19-21, wherein participating in the interrupt handling procedure comprises: receiving the device address associated with the subordinate device over the 1-wire serial bus after the plurality of synchronization pulses is received; and requesting interrupt service by transmitting a pulse over the 1-wire serial bus.
24. The method as described in any of clauses 19-23, wherein responding to the read or write command comprises transmitting or receiving a Manchester encoded data payload over the 1-wire serial bus.
25. A data communication apparatus, comprising: a line driver configured to couple the data communication apparatus to a 1-wire serial bus; and a controller configured to: receive a plurality of synchronization pulses from the 1-wire serial bus after a sequence start condition (SSC) has been received from the 1-wire serial bus; use the plurality of synchronization pulses to synchronize an internal clock signal; participate in an interrupt handling procedure when the plurality of synchronization pulses is encoded with a first value; and respond to a read or write command when the plurality of synchronization pulses is encoded with a second value and followed by an address corresponding to a device address associated with the data communication apparatus.
26. The data communication apparatus as described in clause 25, wherein the plurality of synchronization pulses is encoded using Manchester encoding.
27. The data communication apparatus as described in clause 25 or clause 26, wherein the controller is further configured to: initiate the SSC by driving the 1-wire serial bus from a first signaling state to a second signaling state; and present a high impedance to the 1-wire serial bus after initiating the SSC.
28. The data communication apparatus as described in any of clauses 25-27, wherein the controller is further configured to: request interrupt service by driving the 1-wire serial bus from a first signaling state to a second signaling state in a timeslot associated with the data communication apparatus, wherein the timeslot is one of a plurality of timeslots, and wherein the device address associated with the data communication apparatus determines location in time of the timeslot within the plurality of timeslots.
29. The data communication apparatus as described in any of clauses 25-27, wherein the controller is further configured to: receive the device address associated with the data communication apparatus over the 1-wire serial bus after the plurality of synchronization pulses is received; and request interrupt service by transmitting a pulse over the 1-wire serial bus.
30. The data communication apparatus as described in any of clauses 25-29, wherein the controller is further configured to transmit or receive a Manchester encoded data payload over the 1-wire serial bus.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:
1. A method of data communication performed at a host device, comprising:
transmitting a plurality of synchronization pulses over a 1-wire serial bus after a sequence start condition (SSC) has been transmitted over the 1-wire serial bus, the plurality of synchronization pulses being configured to synchronize one or more receiving devices coupled to the 1-wire serial bus to an untransmitted transmit clock signal;

initiating an interrupt handling procedure when the plurality of synchronization pulses is encoded with a first value; and initiating a read transaction or a write transaction with at least one of the one or more receiving devices coupled to the 1-wire serial bus when the plurality of synchronization pulses is encoded with a second value.

2. The method of claim 1, wherein the plurality of synchronization pulses is encoded using Manchester encoding.

3. The method of claim 1, further comprising:
determining that the SSC has been initiated when the 1-wire serial bus transitions from a first signaling state to a second signaling state; and
terminating the SSC by causing a line driver in the host device to drive the 1-wire serial bus from the second signaling state to the first signaling state.

4. The method of claim 1, wherein initiating the interrupt handling procedure comprises:
causing a line driver in the host device to present a high impedance to the 1-wire serial bus after transmitting the plurality of synchronization pulses after driving the 1-wire serial bus to a first signaling state; and
for each timeslot comprising a pair of cycles of the transmit clock signal:
causing the line driver to present the high impedance to the 1-wire serial bus before the each timeslot commences;
determining whether the 1-wire serial bus transitions from the first signaling state to a second signaling state during a first cycle of the each timeslot;
determining that a subordinate device associated with the each timeslot is requesting interrupt service when the 1-wire serial bus transitions from the first signaling state to the second signaling state during the first cycle of the each timeslot; and
causing the line driver to drive the 1-wire serial bus from the second signaling state to the first signaling state during a second cycle of the each timeslot when the 1-wire serial bus transitions from the first signaling state to the second signaling state during the first cycle of the each timeslot.

5. The method of claim 1, wherein initiating the interrupt handling procedure comprises:
transmitting a device address over the 1-wire serial bus after transmitting the plurality of synchronization pulses;
causing a line driver in the host device to present a high impedance to the 1-wire serial bus after transmitting the device address; and
determining that a subordinate device associated with the device address is requesting interrupt service when a pulse is received from the 1-wire serial bus during a period comprising a configured number of cycles of the transmit clock signal.

6. The method of claim 1, further comprising:
scheduling interrupt service for one or more subordinate devices determined to be requesting interrupt service during the interrupt handling procedure.

7. The method of claim 1, further comprising:
transmitting a Manchester encoded data payload over the 1-wire serial bus after initiating the write transaction.

8. The method of claim 1, further comprising:
receiving a Manchester encoded data payload over the 1-wire serial bus after initiating the read transaction.

9. The method of claim 1, wherein the read transaction or the write transaction is formatted in accordance with a Radio Frequency Front-End (RFFE) protocol.

10. A data communication apparatus, comprising:
a line driver configured to couple the data communication apparatus to a 1-wire serial bus; and
a controller configured to:
transmit a plurality of synchronization pulses over the 1-wire serial bus after a sequence start condition (SSC) has been transmitted over the 1-wire serial bus, the plurality of synchronization pulses being configured to synchronize one or more receiving devices coupled to the 1-wire serial bus to an untransmitted transmit clock signal;
initiate an interrupt handling procedure when the plurality of synchronization pulses is encoded with a first value; and
initiate a read transaction or a write transaction with at least one of the one or more receiving devices coupled to the 1-wire serial bus when the plurality of synchronization pulses is encoded with a second value.

11. The data communication apparatus of claim 10, wherein the plurality of synchronization pulses is encoded using Manchester encoding.

12. The data communication apparatus of claim 10, wherein the controller is further configured to:
determine that the SSC has been initiated when the 1-wire serial bus transitions from a first signaling state to a second signaling state; and
terminate the SSC by causing the line driver to drive the 1-wire serial bus from the second signaling state to the first signaling state.

13. The data communication apparatus of claim 10, wherein the controller is further configured to:
cause the line driver to present a high impedance to the 1-wire serial bus after transmitting the plurality of synchronization pulses after driving the 1-wire serial bus to a first signaling state; and
for each timeslot comprising a pair of cycles of the transmit clock signal:
cause the line driver to present the high impedance to the 1-wire serial bus before the each timeslot commences;
determine whether the 1-wire serial bus transitions from the first signaling state to a second signaling state during a first cycle of the each timeslot;
determine that a subordinate device associated with the each timeslot is requesting interrupt service when the 1-wire serial bus transitions from the first signaling state to the second signaling state during the first cycle of the each timeslot; and
cause the line driver to drive the 1-wire serial bus from the second signaling state to the first signaling state during a second cycle of the each timeslot when the 1-wire serial bus transitions from the first signaling state to the second signaling state during the first cycle of the each timeslot.

14. The data communication apparatus of claim 10, wherein the controller is further configured to:
transmit a device address over the 1-wire serial bus after transmitting the plurality of synchronization pulses;
cause the line driver in the data communication apparatus to present a high impedance to the 1-wire serial bus after transmitting the device address; and determine that a subordinate device associated with the device address is requesting interrupt service when a pulse is received from the 1-wire serial bus during a period comprising a configured number of cycles of the transmit clock signal.

15. The data communication apparatus of claim 10, wherein the controller is further configured to:
schedule interrupt service for one or more subordinate devices determined to be requesting interrupt service.

16. The data communication apparatus of claim 10, wherein the controller is further configured to transmit a Manchester encoded data payload over the 1-wire serial bus after initiating the write transaction.

17. The data communication apparatus of claim 10, wherein the controller is further configured to receive a Manchester encoded data payload over the 1-wire serial bus after initiating the read transaction.

18. The data communication apparatus of claim 10, wherein the read transaction or the write transaction is formatted in accordance with a Radio Frequency Front-End (RFFE) protocol.

19. A method of data communication performed at a subordinate device, comprising:
receiving a plurality of synchronization pulses from a 1-wire serial bus after a sequence start condition (SSC) has been received from the 1-wire serial bus;
using the plurality of synchronization pulses to synchronize an internal clock signal;
participating in an interrupt handling procedure when the plurality of synchronization pulses is encoded with a first value; and
responding to a read or write command when the plurality of synchronization pulses is encoded with a second value and followed by an address corresponding to a device address associated with the subordinate device.

20. The method of claim 19, wherein the plurality of synchronization pulses is encoded using Manchester encoding.

21. The method of claim 19, further comprising:
initiating the SSC by driving the 1-wire serial bus from a first signaling state to a second signaling state; and
presenting a high impedance to the 1-wire serial bus after initiating the SSC.

22. The method of claim 19, wherein participating in the interrupt handling procedure comprises:
requesting interrupt service by driving the 1-wire serial bus from a first signaling state to a second signaling state in a timeslot associated with the subordinate device,
wherein the timeslot is one of a plurality of timeslots, and
wherein the device address associated with the subordinate device determines location in time of the timeslot within the plurality of timeslots.

23. The method of claim 19, wherein participating in the interrupt handling procedure comprises:
receiving the device address associated with the subordinate device over the 1-wire serial bus after the plurality of synchronization pulses is received; and
requesting interrupt service by transmitting a pulse over the 1-wire serial bus.

24. The method of claim 19, wherein responding to the read or write command comprises transmitting or receiving a Manchester encoded data payload over the 1-wire serial bus.

25. A data communication apparatus, comprising:
a line driver configured to couple the data communication apparatus to a 1-wire serial bus; and
a controller configured to:
receive a plurality of synchronization pulses from the 1-wire serial bus after a sequence start condition (SSC) has been received from the 1-wire serial bus;
use the plurality of synchronization pulses to synchronize an internal clock signal;
participate in an interrupt handling procedure when the plurality of synchronization pulses is encoded with a first value; and
respond to a read or write command when the plurality of synchronization pulses is encoded with a second value and followed by an address corresponding to a device address associated with the data communication apparatus.

26. The data communication apparatus of claim 25, wherein the plurality of synchronization pulses is encoded using Manchester encoding.

27. The data communication apparatus of claim 25, wherein the controller is further configured to:
initiate the SSC by driving the 1-wire serial bus from a first signaling state to a second signaling state; and
present a high impedance to the 1-wire serial bus after initiating the SSC.

28. The data communication apparatus of claim 25, wherein the controller is further configured to:
request interrupt service by driving the 1-wire serial bus from a first signaling state to a second signaling state in a timeslot associated with the data communication apparatus,
wherein the timeslot is one of a plurality of timeslots, and
wherein the device address associated with the data communication apparatus determines location in time of the timeslot within the plurality of timeslots.

29. The data communication apparatus of claim 25, wherein the controller is further configured to:
receive the device address associated with the data communication apparatus over the 1-wire serial bus after the plurality of synchronization pulses is received; and
request interrupt service by transmitting a pulse over the 1-wire serial bus.

30. The data communication apparatus of claim 25, wherein the controller is further configured to transmit or receive a Manchester encoded data payload over the 1-wire serial bus.

* * * * *